US010695689B2

(12) United States Patent
Weston

(10) Patent No.: US 10,695,689 B2
(45) Date of Patent: Jun. 30, 2020

(54) SMART ENTERTAINMENT TECHNOLOGY ATTRACTIONS

(71) Applicant: Infinite Kingdoms, LLC, Wakefield, RI (US)

(72) Inventor: Denise Chapman Weston, Wakefield, RI (US)

(73) Assignee: INFINITE KINGDOMS, LLC, Wakefield, RI (US)

( * ) Notice: Subject to any disclaimer, the term of this patent is extended or adjusted under 35 U.S.C. 154(b) by 0 days.

(21) Appl. No.: 16/234,812

(22) Filed: Dec. 28, 2018

(65) Prior Publication Data

US 2019/0201806 A1    Jul. 4, 2019

Related U.S. Application Data

(60) Provisional application No. 62/612,394, filed on Dec. 30, 2017.

(51) Int. Cl.
*G06T 15/00* (2011.01)
*A63G 31/00* (2006.01)
(Continued)

(52) U.S. Cl.
CPC .............. *A63J 5/021* (2013.01); *A63G 31/00* (2013.01); *A63G 31/16* (2013.01); *A63H 13/005* (2013.01);
(Continued)

(58) Field of Classification Search
CPC ......... G06T 15/00; G06T 15/08; G06T 19/00; G06T 19/20; A63F 13/00; A63F 13/10;
(Continued)

(56) References Cited

U.S. PATENT DOCUMENTS 8,411,092 B2 * 4/2013 Sheblak ................. A63F 13/10
                                                       345/428
9,305,403 B2 * 4/2016 Cabrita .................... G06T 19/20
(Continued)

FOREIGN PATENT DOCUMENTS

WO      2009/114069 A2    9/2009

OTHER PUBLICATIONS

Notification of Transmittal of the International Search Report and the Written Opinion of the International Searching Authority (Forms PCT/ISA/220, PCT/ISA/210 and PCT/ISA/237) dated Mar. 18, 2019, by the European Patent Office in corresponding International Application No. PCT/US2018/067829. (10 pages).

*Primary Examiner* — Kien T Nguyen
(74) *Attorney, Agent, or Firm* — Buchanan Ingersoll & Rooney PC

(57) ABSTRACT

Smart Entertainment Technology uses technology to create an enhanced, real-world experience or adventure, and helps users explore, communicate, learn, and solve puzzles, creating a richer, more immersive experience. In one embodiment, a method includes identifying a plurality of patrons in an entertainment attraction using a contactless sensor. The entertainment attraction comprises a room, and each wall of the room comprises modular, interconnected, adaptable full-wall digital displays. The method further includes determining a digital attraction experience suitable for each of the patrons based on the age and attraction preferences of each of the patrons. The method additionally includes formatting for display on the modular full-wall digital displays content associated with the determined digital attraction experience. The method further includes determining an interactive gesture performed by one of the patrons, and formatting for display on the full-wall digital displays, appropriate content responsive to the interactive gesture.

20 Claims, 13 Drawing Sheets

(51) Int. Cl.
    *A63J 5/02*      (2006.01)
    *G06F 3/01*      (2006.01)
    *G06F 3/14*      (2006.01)
    *G06F 3/0488*    (2013.01)
    *G06F 3/147*     (2006.01)
    *G06F 3/03*      (2006.01)
    *G06F 3/0481*    (2013.01)
    *A63G 31/16*     (2006.01)
    *A63H 13/00*     (2006.01)
    *A63J 1/02*      (2006.01)
    *G06K 9/00*      (2006.01)

(52) U.S. Cl.
    CPC ............... *A63J 1/02* (2013.01); *G06F 3/011* (2013.01); *G06F 3/017* (2013.01); *G06F 3/0304* (2013.01); *G06F 3/04815* (2013.01); *G06F 3/04883* (2013.01); *G06F 3/147* (2013.01); *G06F 3/1446* (2013.01); *G06F 2203/011* (2013.01); *G06K 9/00288* (2013.01); *G06K 9/00335* (2013.01)

(58) Field of Classification Search
    CPC .. A63F 2300/6018; A63G 31/00; A63G 31/16
    USPC ............. 472/60, 61, 130; 345/418, 419, 428
    See application file for complete search history.

(56) References Cited

U.S. PATENT DOCUMENTS

| | | |
|---|---|---|
| 9,779,538 B2 | 10/2017 | Sanders et al. |
| 2015/0190726 A1 | 7/2015 | Frolov |

* cited by examiner

SMART ENTERTAINMENT TECHNOLOGY ATTRACTIONS

CROSS-REFERENCE TO RELATED APPLICATION

This application claims the benefit of U.S. Provisional Patent Application No. 62/612,394 filed on Dec. 30, 2017, the disclosure of which is incorporated herein by reference in its entirety.

TECHNICAL FIELD

This disclosure generally relates to smart entertainment attractions including smart rooms and smart components.

BACKGROUND

Amusement parks, museums, shopping centers, and other attraction, retail, or entertainment-based properties often host interactive experiences to attract in-person visits by customers and increase popularity and customer engagement. For example, an amusement park builds a new ride in connection with a movie release in order to capitalize on the popularity of the movie and increase customer interaction and involvement with the franchise. In fact, entertainment businesses often heavily rely on the interactive experiences available at theme parks to build synergies with their franchises. As another example, a shopping mall hosts an interactive holiday-themed play-place for children to increase customer traffic and drive sales for its resident retailers. As yet another example, animal or nature-themed parks, such as zoos, are home to many diverse exotic and rare breed animals and host interactive shows featuring those animals in order to entice customers to visit.

However, the attractions available at many properties often require substantial investment and are limited in scope. For example, a theme park may only be geared towards one or a fixed set of static, specific concepts, franchises, or themes at any given time. These attractions must be routinely updated, requiring even more investment when a movie loses popularity, or as soon as the seasons change or a holiday passes. Attractions such as rides require significant installation costs that vary based on the scope and features of the ride. Other attractions carry significant danger and risks to customers or patrons associated with riding or operation of the attraction. Further, common attractions at parks fail to tailor the experience based on any particular user and instead provide the same cookie-cutter experience for each user that visits the attraction. Moreover, the rise of in-home virtual reality or otherwise virtually interactive experiences available through the internet or gaming consoles may prevent customers from attending a park in person. If consumers are not compelled by the attractions at a given park, they may choose to stay home instead. Accordingly, parks are constantly under pressure to invest more to upgrade attractions in order to keep customers happy.

Animal or nature-themed parks face many additional challenges in addition to the economic challenges described above. Animal and nature-park grounds require meticulous maintenance, and the often unwieldy animals that live there require round the clock care and supervision. Skilled veterinary medical practitioners must also be on call in case any number of animals experience a health issue. Native environments must be maintained for resident animals by horticultural experts, and the animals must be provided native stimulation on a daily basis to avoid depressive effects. In fact, some animal rights activists have called attention to and even gained popularity protesting the living conditions for animals at several large animal parks.

DESCRIPTION OF EXAMPLE EMBODIMENTS

Smart Entertainment Technology Attractions

The teachings of the present disclosure describe smart entertainment technology (SET) attractions that provide enhanced interactive spaces for creating dynamic entertainment at attraction-based properties, such as theme parks, waterparks, museums, shopping centers, resorts, location-based entertainment centers, events, nature-based parks, and the like. In certain embodiments, a digital room is constructed that may include, for example, one or more of a digital ceiling, wall, and/or floor graphic interface display panels, 2 dimensional (2D) or 3 dimensional (3D) renderers, holographic renders, and the like. Guests of the attraction enter the enhanced interactive space and can be immersed in an artificial or virtual reality setting. The smart entertainment attraction tracks user interaction, responds to user input and feedback, and records user actions to customize experiences for guests, thus creating dynamic, immersive, theatrical, advanced, interactive, and personalized attractions. These smart entertainment attractions may also provide additional opportunities or suggestions for operators of the attraction to streamline attraction efficiencies, increase user interaction, or provide assistance to users.

In certain embodiments, smart entertainment room components are modular, allowing the designer to incorporate any combination of one or more interactive interfaces or elements based on the needs of the particular application and attraction stakeholders, and accounting for budgetary constraints. In other words, the components of the room may be built or assembled like a kit. For example, smart rooms can be constructed wall by wall, with a ceiling and a floor, furniture, props, animatronic devices, human operators, and the like as desired. As another example, immersive 3D projection equipment may be installed to render 3D objects within the confines of the smart room. Those of ordinary skill in the art will appreciate the various additional interfaces, projectors, equipment, and the like that may be incorporated into such a room to provide users with an immersive virtual experience. In certain embodiments, the modular design may enable construction of a virtual room by creating and installing each virtual "wall" one at a time.

Figure 6:
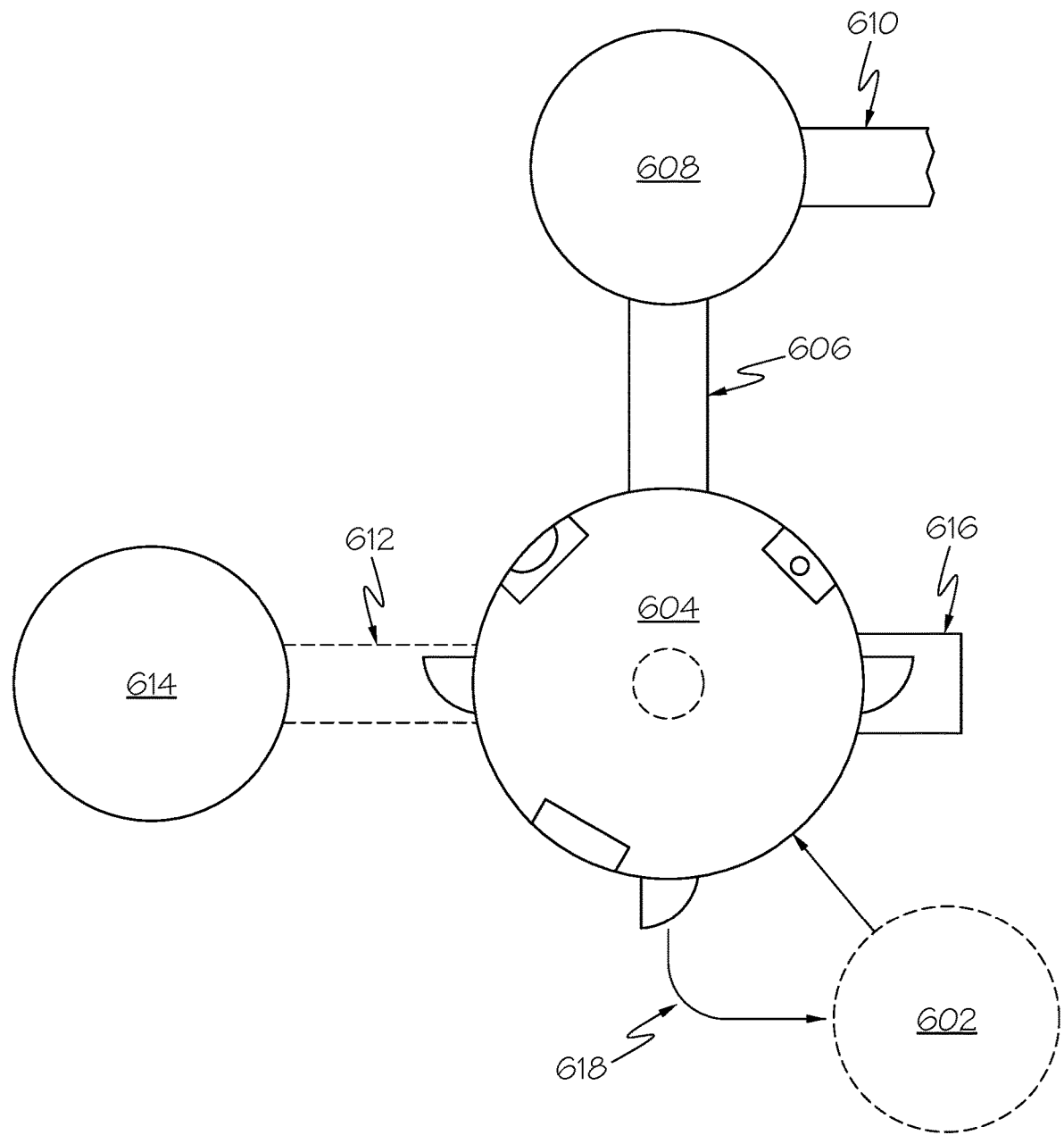
FIG. 6 illustrates an example layout of a smart space including numerous interconnected smart rooms featuring dynamic modular configuration features in accordance with a non-limiting embodiment of the present disclosure.
Figure 7A:
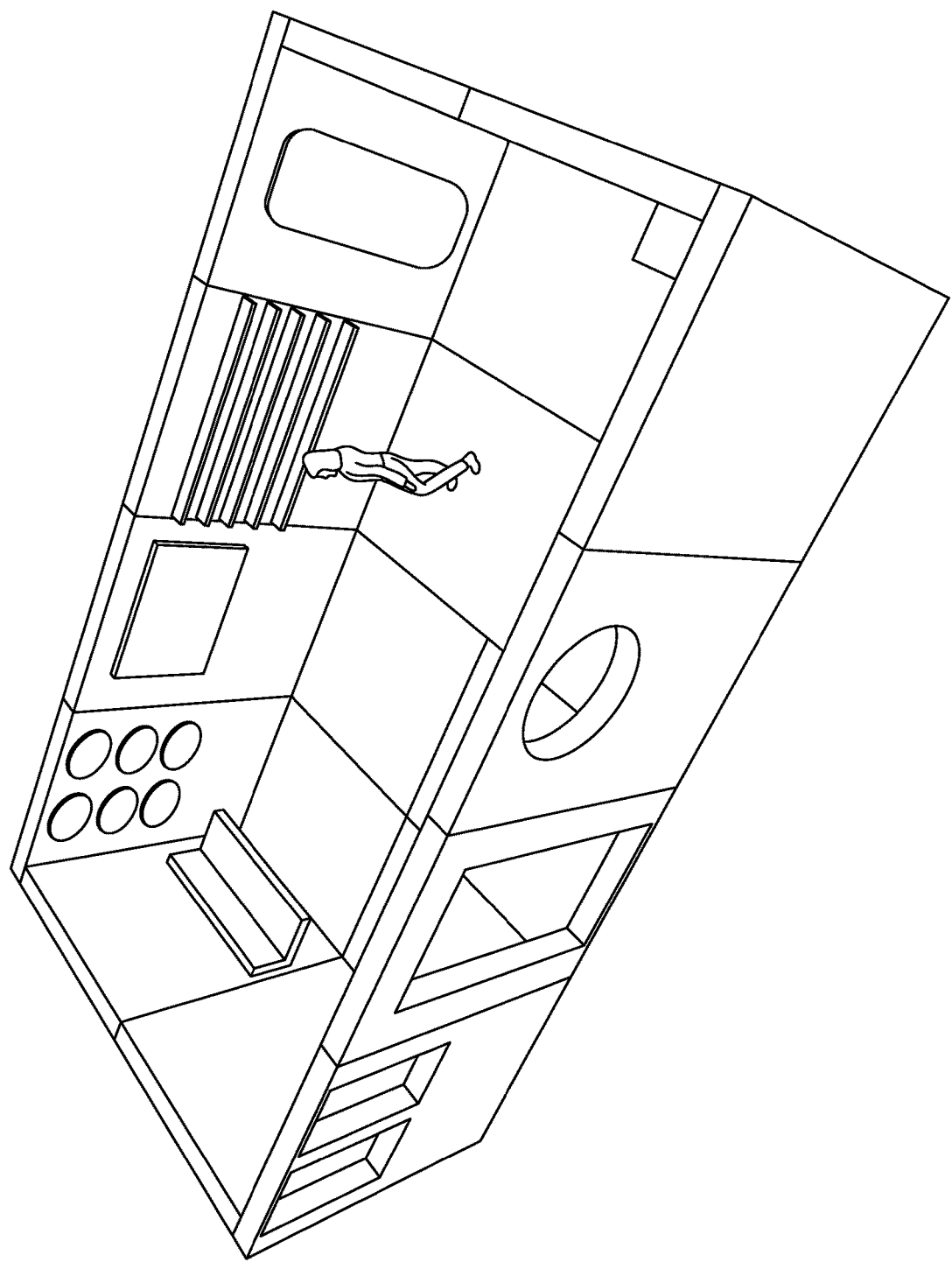
FIG. 7A illustrates a three-dimensional rendering of a smart room with modular walls and room features in accordance with a non-limiting embodiment of the present disclosure.
Figure 7B:
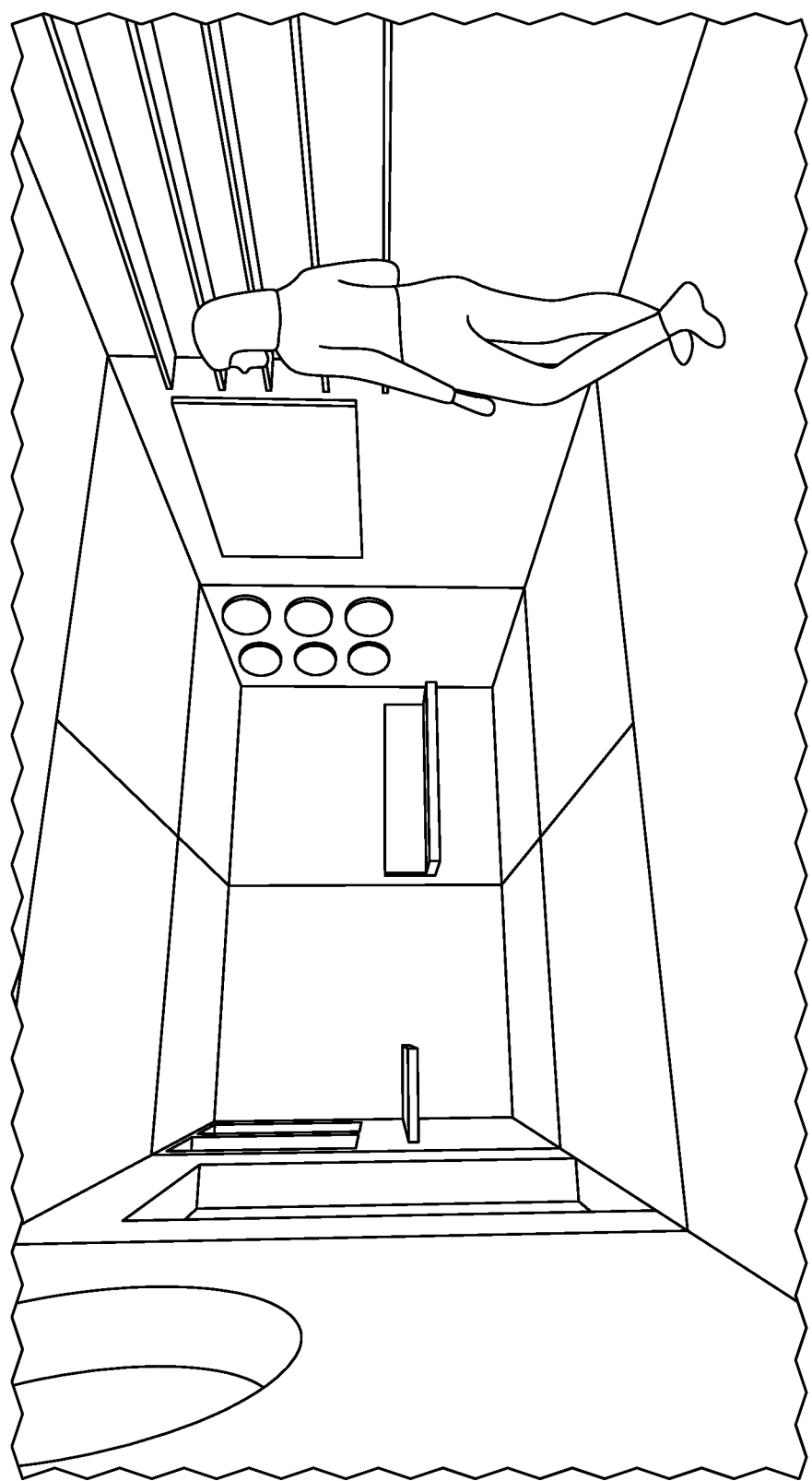
FIG. 7B illustrates a three-dimensional rendering of a smart room with modular walls and room features in accordance with a non-limiting embodiment of the present disclosure.
Figure 8A:
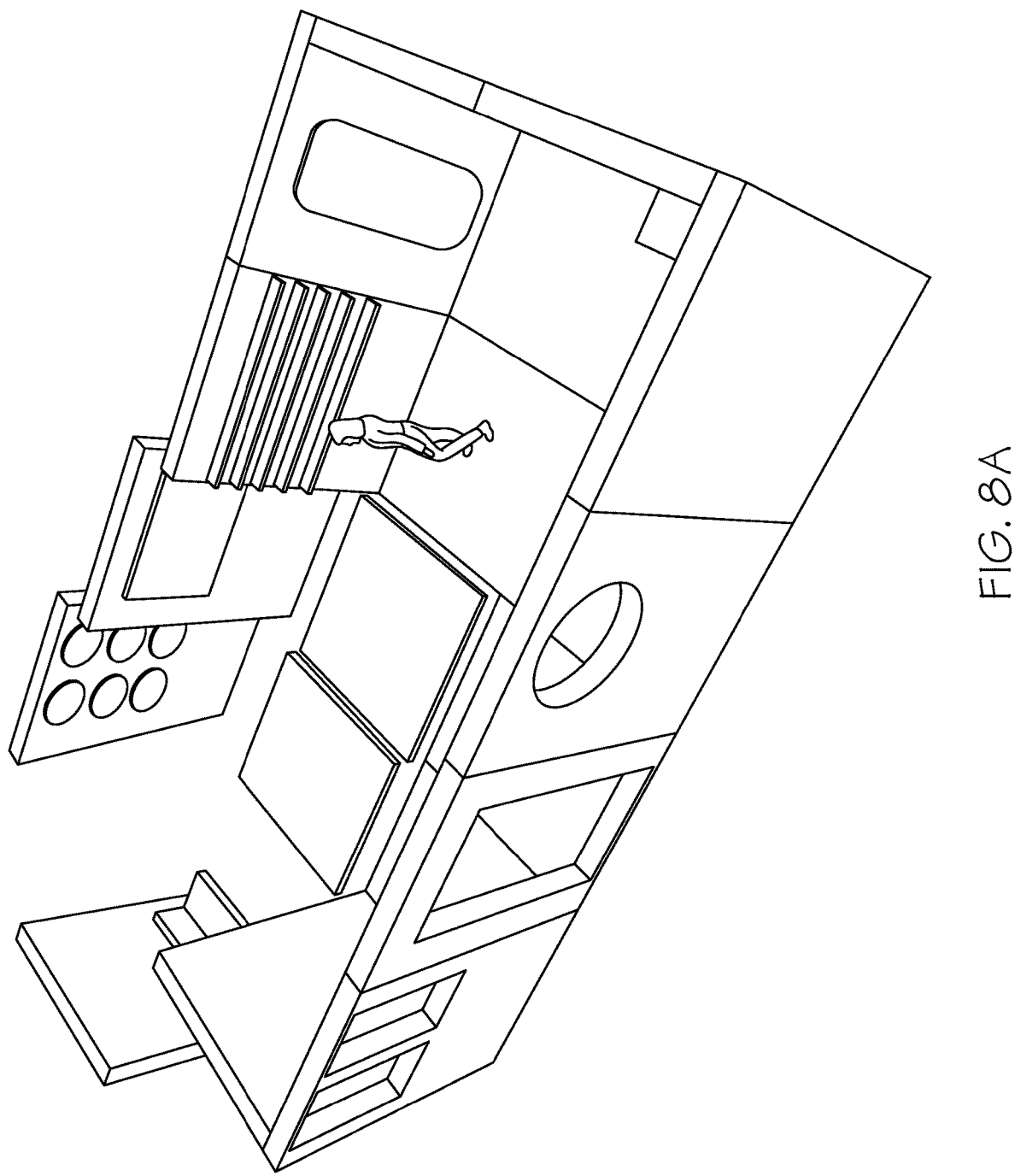
FIG. 8A illustrates a three-dimensional rendering demonstrating the dynamic and modular nature of smart room wall and floor panels in accordance with a non-limiting embodiment of the present disclosure.
Figure 8B:
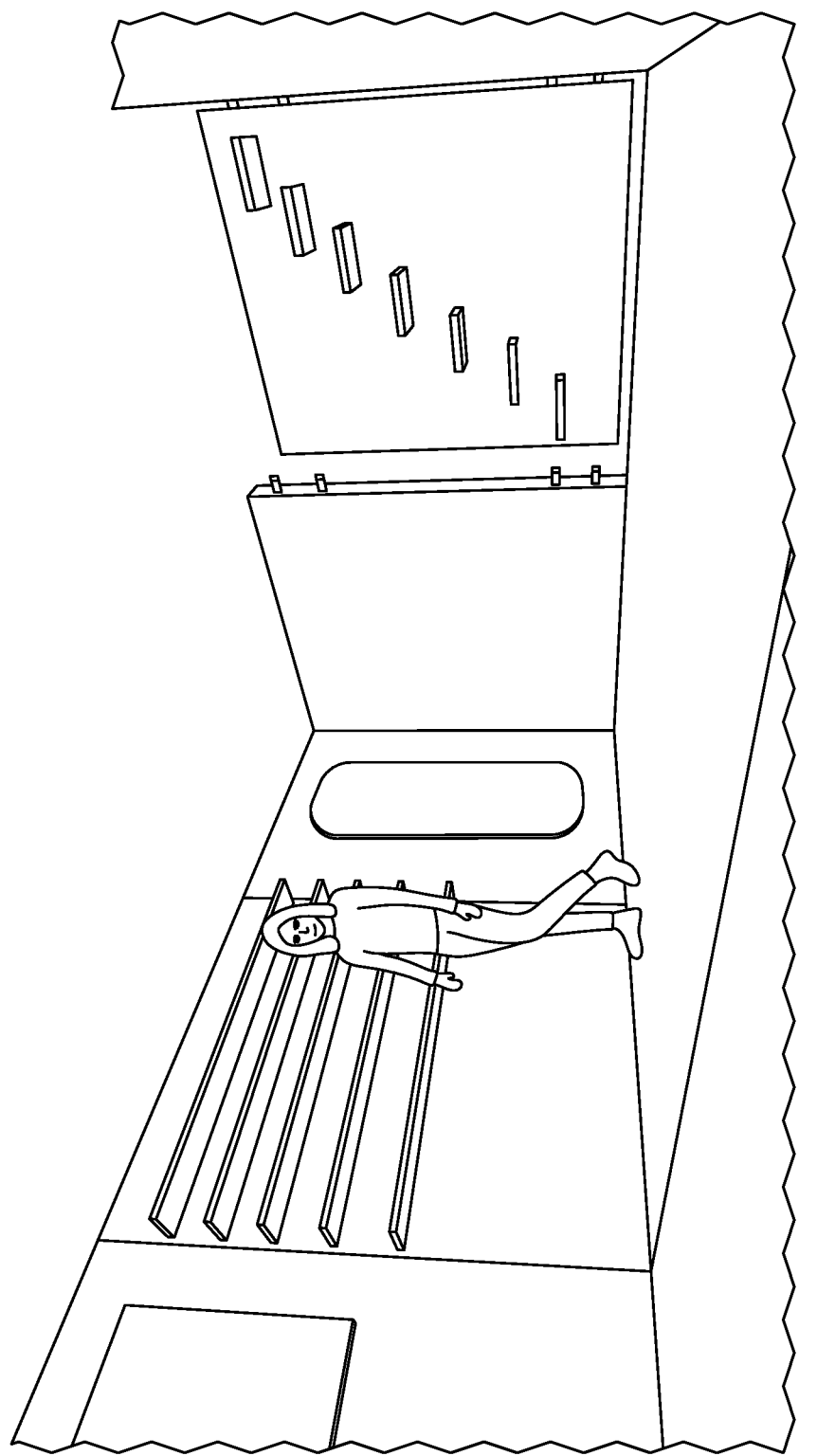
FIG. 8B illustrates a three-dimensional rendering demonstrating the dynamic and modular nature of smart room wall panels in accordance with a non-limiting embodiment of the present disclosure.
Figure 8C:
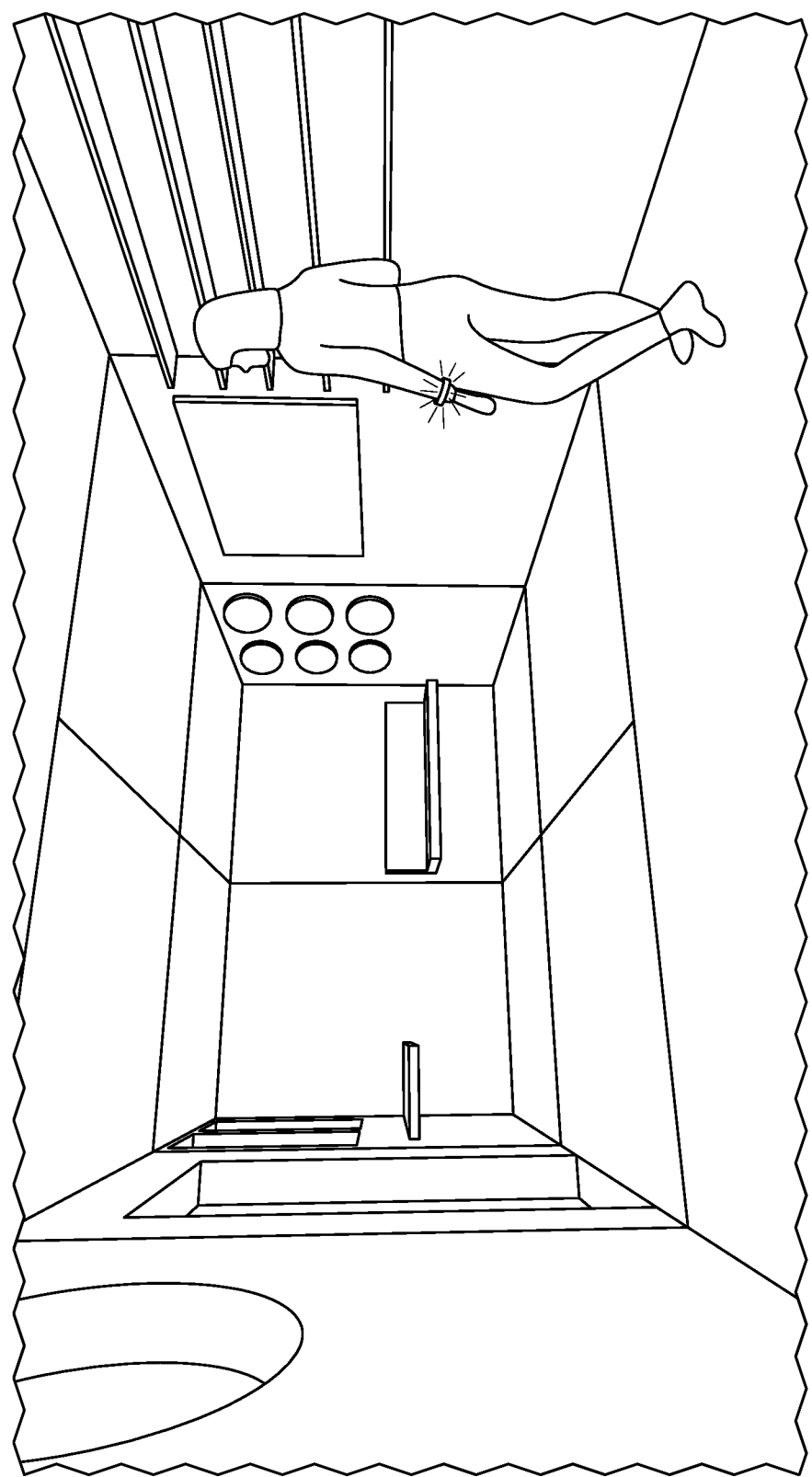
FIG. 8C illustrates a three-dimensional rendering of a smart room customized for a particular user by identifying information about a user based on a detected wrist band in accordance with an on-limiting embodiment of the present disclosure.

For example, the modular architecture of the interactive attractions are illustrated with reference to FIG. 6, which shows a plurality of modular smart rooms (602, 604, 614, and 608, linked together with passageways 618, 612, 616, 606, and 610, that also contain interactive digital attractions to form a "ride" or smart entertainment attraction. For example, a user enters the attraction at room 602, which contains the pre-show story and retail options. The user moves through hall 618 to smart room 604, which responds to user actions performed in room 602. The user may then move through smart hallway connectors 606, 612, 610, or 616 to other smart rooms 608, 614, etc.

In certain embodiments, each virtual wall, floor, ceiling, or regions of the interior of the room itself are equipped with sensors such as touch, motion, gesture, or other sensors that detect user input. Moreover, scanners, facial or biometric recognition software, radio frequency identification device (RFID) sensors, cameras, contactless sensors, audio sensors, and the like may track users or occupants of the room and any input or feedback provided by them. For example, a wall of a smart room may be equipped with touch input sensors that detect user input, gestures, and the like. In certain embodiments, the smart room may use cameras, displays, and/or video/audio/physical and other sensory effects as the situation requires.

By assembling sets of modular smart walls, floors, cubes, ceilings, and the like together, grids of smart structures may be built to create rooms, hallways, mazes, ceilings, magic doors, floors, showcase areas, or any such combination. For example, a haunted house can be constructed by assembling sets of smart rooms, connected by smart hallways. Interactive elements of the haunted house may request and detect user input and guide the detected users through the haunted passages. As another example, users are forced to solve puzzles or riddles by interacting with virtual components of the smart room in order to advance to the next room, hallway, or element of the attraction.

The experiences provided by these smart rooms may be changed with minimal effort, and primarily with software or graphics updates without requiring significant infrastructure investment or the like. Moreover, the smart rooms can be preloaded with different configurations or scenarios and may customize the experience for a particular user. In other words, the content and interactive programming of the rooms may be changed between visitors by detecting each person in the smart room at any given time to provide totally different experiences that are customized for each user.

Figure 1:
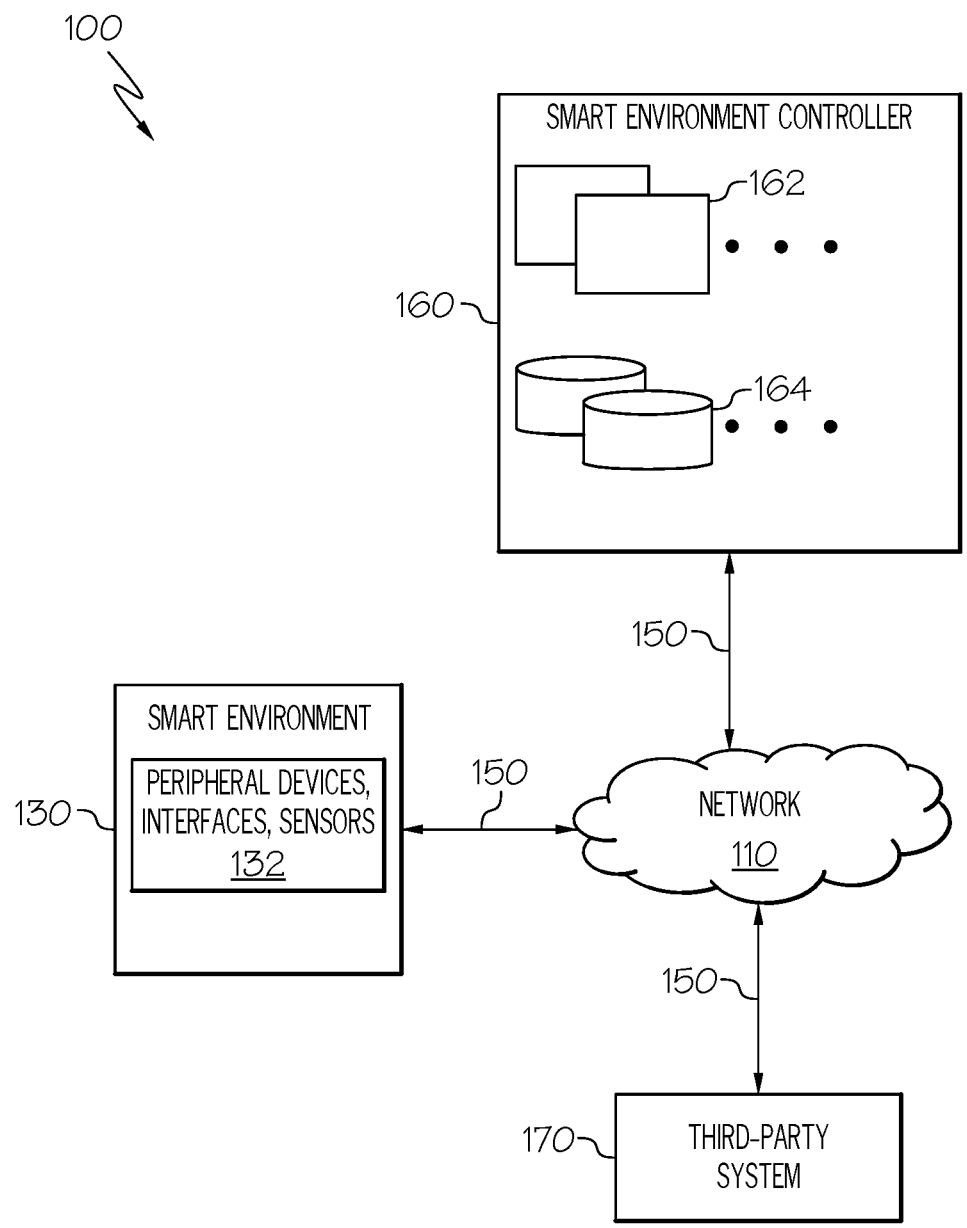
FIG. 1 illustrates an example block diagram of a smart environment system in accordance with a non-limiting embodiment of the present disclosure.

For example, with reference to FIG. 1, a block diagram depicting a system 100 for interactive smart environment based attractions is illustrated in accordance with a non-limiting embodiment of the present disclosure. System 100 includes smart environment (or room) controller 160 which may be executed on or with access to server 162 and data store 164. Smart environment controller 160 is connected to smart environment 130 and third-party system 170 via network 110 and network links 150. Smart environment 130 includes a non-limiting example of various peripheral devices, interfaces, sensors, and other interconnected smart environment devices 132 installed in the smart environment. In certain embodiments, smart environment controller 160 receives input from and controls environment variables at the smart environment as described in further detail with reference to the non-limiting examples described below.

Smart Environment Recognition

Figure 2:
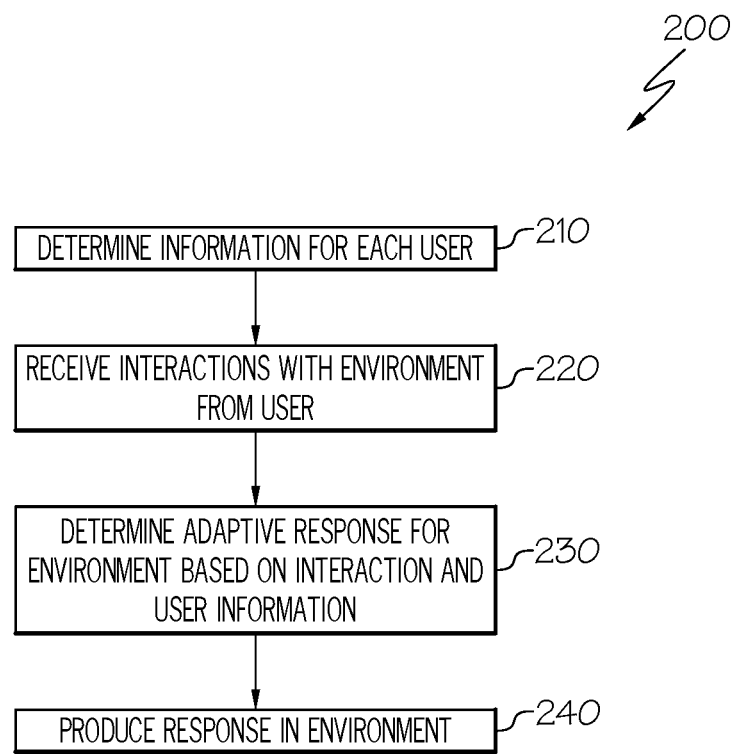
FIG. 2 illustrates an example flow chart for recognizing, reacting to, and providing adaptive and interactive displays in smart environment attractions in accordance with a non-limiting embodiment of the present disclosure.

In certain embodiments, one or more computer processors are configured at a central server or computer to execute computer readable instructions for a smart room controller to operate smart rooms and associated peripheral devices. For example, with reference to FIG. 2, a flowchart 200 for recognizing, reacting to, and providing adaptive and interactive displays in attractions is shown in accordance with a non-limiting embodiment of the present disclosure. At step 210, information about each user in a particular smart environment is determined. For example, the smart controller controls and receives feedback from one or more of each of the sensors illustrated with reference to the descriptions below, FIGS. 3-6, and, without limitation, other sensors that may be known by those of ordinary skill in the art. For example, the user input may be received by one or more of a scanning device, such as a camera, an RFID or other contactless scanner, a facial recognition or biometric recognition scanning device, manual user input, or age-detection software. As another example, scanning devices and processes may be equipped to detect a relative age of users or participants in the smart environment.

In certain embodiments, information is determined about each participant or user of the smart environment upon entry into the environment. For example, a camera may capture images of a user's face, or other attributes of the user and attempt to determine information about the user. For example, the information may include age, enthusiasm, a level of fright or fear, a level of engagement or enjoyment, socioeconomic factors, temperature factors, or other information discernable upon inspection and analysis of a user and his or her attributes. As another example, the scanning and user information detection capabilities may be connected to outside processes or databases that further determine information regarding the user and return that information to the smart room controller for additional processing.

In certain embodiments, smart rooms may be designed to utilize various technologies that track and determine information about the identity of a user and respond to the user, or multiple users in a group, based on image, voice, mobile device, mapping, geo-location, and emerging technologies, or more complex technologies that analyze previous activity of a user. For example, information regarding a user's previous actions can be analyzed, including things that the user has chosen, picked, created, bought, acquired, seen, and/or accomplished before they entered the smart environment. Certain pieces of this information can be readily determined, for example, with reference to internal or external databases, such as social networking systems, public databases, employer databases, or the like. In certain embodiments, guests may choose to wear a device into the room that will contain guest information.

In certain embodiments, the smart room or controller may know or determine information about the guest and what he/she has done through, for example, passive and active technology, or some combination of both. For example, user identification and information gathering can be performed using various combinations of RFID, wireless, cell phone signals and devices, Bluetooth, proximity sensors, heat sensors, facial recognition, computer recognition, fingerprint scanning, x-ray, GPS, scanning and other new technologies yet to be developed for locating, tracking and identifying people and information regarding them, in addition to choices they have made.

Returning to FIG. 2, at step 220, user interactions within the smart environment are determined. For example, input devices and other sensors track user motions such as physical movements, gestures, points, taps, and other actions of users in the smart environment. In certain embodiments, the environment itself or individual characters and objects in the environment may be modified based on guest actions. In other words, when guests interact with interfaces, displays, characters, or other objects in the environment, the environment itself may change in response to those actions. For example, sensors may be capable of at least the following non-exclusive list of user interaction or tracking mechanisms that may relay information to a smart room controller for further processing and a determination of reaction events for the environment.

For example, device tracking, image recognition, voice recognition, mobile device recognition, or facial/fingerprint recognition capabilities may be incorporated in the smart environment infrastructure and may relay information to a smart room controller. Additionally or alternatively, geolocation, global positioning satellite, wireless triangulation, camera tracking, and emerging technology can be used to determine a position of a user in a smart environment and may determine the users' position relative to other objects or other users in the environment. Additionally or alternatively, room based triggers, such as lasers, light sources, or motion detectors, scanners, and hands-on use input may be used. Additionally or alternatively, external interconnections to other experiences in, for example, a park or entertainment center, or associated events may be used. Additionally or alternatively, sensory effects, super heightened sensor, and regular sensor technology may be used. Additionally or alternatively, real data tracking and conversion into instantaneous feedback can be used, as well as touch recognition of the user.

Smart Environment Response

Returning to FIG. 2 at step 230, the user input and interactions are used to determine information about the user. For example, a smart room controller may use input from various interconnected input devices, input about known users or groups of users, as well as independent indicators of engagement to determine a smart environment response or set of responses. In certain embodiments, the responses can be tailored to a particular purpose, such as to increase user engagement, surprise a user, or to make a user feel a particular type of way. For example, information collected about a user can be used to make the user feel happy or scared. A smart room controller can be operated according to rules or other input in order to optimize, maximize, or increase goals for a particular user or a group of users.

Next, at step 240, a smart room controller may use determined and collected data and input about a user to carry out an interactive response tailored to the user, the user's input, the group of users in the smart environment, the amount of time the users have been in the environment, rule-based expectations, and the like. For example, once the controller has collected or determined that a user has entered the environment, the controller may access a database of that person's internal and external history, preferences and past actions. In certain embodiments, certain audio/visual elements may be queued to occur in a room or series of rooms and hallways. In certain embodiments, the controller may know or determine the preferences, accomplishments or missions for a group of people who enter at one time and tailor the experience to each individual and the group simultaneously.

In certain embodiments, a smart attraction, environment, or room experience can be configured as a series of environments. For example, a smart attraction may include a single room, multiple rooms connected together, or an endless number of "rooms" or environments digitally connected around a particular location or the world. For example, one configuration may be comprised of blank white walls or partially built sets with one or more 3D props. When the smart environment is not in operation, all of the walls may be white or blank screens. Thus, initial infrastructure investment to create such a room may be quite minimal. External smart environment technologies, such as projectors, sensors, 3D display devices, and controllers may be installed in such a room in order to turn the room into a dynamic attraction in accordance with the teachings of the present disclosure.

In certain embodiments, a wide array of environments, attractions, or displays can be configured or chosen by guests. For example, if one set of guests chose a haunted house mission, sensors leading into the room detect this selection, as well as additional information about the audience (guests). Images may begin to appear all around the room to make it seem like the room is a fully dimension room inside a haunted house. In certain embodiments, the experience is tailored to the viewers based on information provided by or determined about those users. In certain embodiments, 3D glasses, virtual reality or augmented reality may be worn by the guests in order to enhance this experience, but the attraction itself is a real experience that is only augmented by digital assets, not solely created virtually around the user. Such a configuration may provide real world physical changes to the smart environment that are customized to each particular user based on their information. This enhances customer experience by increasing user interaction and engagement.

As another example, if the guests have chosen an Egyptian pyramid adventure, images appear all around the room to make it seem like a fully dimensional room inside a pyramid. If guests have chosen an Amazon jungle adventure, images appear all around the room or hallway to make it appear as a fully dimensional jungle all around.

In certain embodiments, 3D mapping and projections may be used to project images onto otherwise blank 3D objects. For example, a 4' wide by 6' high rectangle against one wall can appear to be a chest of drawers for the haunted house scene or it can appear to be a stone column as part of the pyramid interior. Holographic images, smart animatronics and similar dimensional real or virtual items can also appear in the room based on information the guests have chosen or accomplished beforehand. For example, a witch can appear in the haunted house room or a mummy in the pyramid themed room. Those characters can be 2D video, holographic, animatronics or real people. For example, each character may respond to users or players seamlessly within the context of the story and past events and choices by each guest as determined by the smart room controller.

In certain embodiments, these "characters" can show different levels of scare factor based on what a particular guest has chosen or what was determined about the guest before entering the environment. For example, a witch and mummy can be horrifying, dripping blood and appear very aggressive on the highest settings, while being very tame or perhaps not in the room at all on the lowest settings. In certain embodiments, the smart room controller may determine an appropriate scare factor, or other factor, based on information it gains or determines from or about the players in the environment. For example, the controller may determine that a child is terrified at a given scare factor, based on facial recognition and gesture recognition processing. In this example, the controller may turn down the scare factor for the environment effects. Additionally or alternatively, the controller may change the theme of the room to include more humor in order to alleviate any perceived anxiety in the users. In certain embodiments, the controller may determine that a particular child is not impressed with the current scare factor based on facial indicators and other feedback. The controller may dim the lights and increase the intensity of the attraction in order to elicit the goal feedback from the child.

In certain embodiments, the smart room controller can adjust the experience based on what guests may have previously accomplished, bought or been given. For example, perhaps a guest has a real or digital torch. Shadows can be shown on the video screens around the rooms and other areas of the room may remain dark as the guest moves around the room with the torch. For example, a smart room controller uses sensory information from smart environment sensors to determine the user's movements and the relation of the digital torch to other objects in the room. 3D processing and illumination graphics processing can determine the proper ratio for shadows and other projections emanating from the digital object. The controller then directs the smart environments displays and sensory equipment to respond to the user's actions.

For example, a heat effect may be increased in a particular area close to a fire to simulate heat from flames. As another example, if a guest has earned a sword or dagger earlier in their experience, a digital, animatronic, or real life (operator dressed as a mummy) mummy may attack them. As another example, a user may have found an amulet in a previous room or experience. The user action of hanging the amulet around the mummy's neck can be determined by the smart room controller through sensory devices. The controller can then instruct the mummy (digital, animatronic, or real life) to come alive, speak to users, and give them clues to the next room. The mummy may or may not appear if they have or haven't found the amulet. Thus, the actual objects displayed or present in the smart environment can be customized according to previous user actions as determined and controlled by the controller. The controller can adapt the experience to the guest or group based on the information collected during each guest's experience. Those of ordinary skill in the art will appreciate that multiple such determinations and interactions can be processed in rapid succession in order to provide guests with real time interactive experiences in the smart environment over a short or extended period of time.

In certain embodiments, a smart room controller can perform crowd and capacity management capabilities. For example, theme parks or location based entertainment features often have requirements that guests pass through each attraction at certain intervals in order to attain capacity requirements or throughput. The smart room controller may, for example, time each guest's or group's entrance and automatically provide them with easier and easier clues so they can find their way out within a predetermined period of time in order to let the next group enter and enjoy the attraction. Since this happens automatically through determinations made by the controller, guests will likely not understand that they are receiving clues but, rather, may perceive this as part of the experience.

For example, an attraction requires that up to 20 guests need to pass thru the room every 3 minutes and a "temple room" requires them to press 10 different stone blocks on the wall with symbols on them in order to unlock the door. In this example, the necessary blocks may begin to glow faintly one at a time after the guests have been in the room for 1 minute. Additionally or alternatively, clues for the correct blocks to touch may be displayed or otherwise presented in the environment. Some guests may be wearing devices which may also being to glow, pulse, and display or give a clue to the user in various ways what to do next. The longer the group stays in the room, the more obviously and brighter the blocks glow to motivate the players to touch them. Additionally or alternatively, a holographic mummy, for example, can begin speaking clues to the guests after a certain period of time. In certain embodiments, doors automatically open or close based on a time period or other determination of a controller. The smart environment features may work together seamlessly to move guests thru the experience in a way that doesn't seem to them artificial or disconnected from their story and experience.

In certain embodiments, live staff members that are part operational control and part actors are given cues by the smart room controller or displays controlled by such a controller when to appear, where and what to say to the guests to assist the guest or deepen their experience. Thus, the smart environment technology can work together with the operators of the event space to seamless connect live action, animation, 3D and virtual experiences together so that the guest is never quite sure of what is real and what is a theme park attraction with the total goal of complete immersion of the guest into any storyline and theme within a given space.

In certain embodiments, smart reactive and response technologies, including interactive and theatrical responses include: audio/visual responses, sensory effects (SFX) responses, gamified and inventory, customized artificial intelligence responses, animatronic responses, retail item responses, mobile device responses, content responses, room environment change responses, story and game data evolutionary responses, operational/live staff responses, photo response out of park reactions, unlock/access responses, secure point of sale (POS) responses, media sharing responses, machine activation (print sticker and/or coin dispense) responses, and the like.

In certain embodiments, response may additionally or alternatively include support (answer questions, give directions, map, clues) (e.g., AMAZON ECHO ALEXA/ GOOGLE HOME), leveling and gamification, messaging, mixed reality responses virtual reality/augmented reality (VR/AR), real time feedback, analytics and customization, connection to other smart rooms/experiences interaction, and digital mapping and projection responses. Those of ordinary skill in the art will appreciate the large number of peripheral devices that may be controlled by a smart room controller in order to increase interactivity and engagement of users in an entertainment attraction setting.

SET Record/Remember

In certain embodiments, information about a user or a group of users may be recorded and stored in order to inform future entertainment experiences at the same or other attraction franchises. For example, the smart room controller may be connected to a storage device and may be able to store personal information in the form of documentation or other user attributes and customized features of players, such as how they reacted in each attraction. The information may then be anonymized and used to improve the experience for other guests or that same guest. For example, to improve turn out from a particular demographic, the experience can be customized to improve user reactions and responses. The sensors can inspect user reactions at each phase of the attraction experience (before, during, and after), as well as individual responses to individual portions.

In certain embodiments, the smart controller may use collected data as training data in order to measure improvements in reaction metrics over time. For example, a machine learning algorithm may be used to automate interaction detection and responses in order to increase user engagement. For example, the machine learning algorithm may be trained with feature vectors describing each user interaction including demographic information, reaction information, vital information, and other information as features. Responses can be tailored to elicit a certain response in the user feature vectors. The machine learning data set or training data may continually be expanded as more users experience the attraction.

In certain embodiments, stored user or group information can be used to, for example, give levels and points for use in future visits to live locations, as training data for artificial intelligence agents based on user preferences and analytics. In certain embodiments, the smart controller may perform digital collection and inventory storage of user or attraction data, photo and film storage, smart environment device upgrading or recommendations, additional programming or gaming for online and on mobile devices, activation of home devices including related or linked attractions for the home, mobile integration, application integration, online integration, operations analytics, machine learning, smart room upgrades, and the like.

In certain embodiments, the teachings of the present disclosure may be applied in a home entertainment environment. The difference in this case would be specific devices for the home may be developed that are unique to smart environment attractions. For example, this may include a compact SFX system that can be put in a home. For example, interconnected game boards and toys that collaborate together as one holistic experience and home "live theatre" similar to playing charades only queuing up sounds and "ghost" (e.g., animatronic, holographic display, etc.) performances.

In certain embodiments, the teachings of the present disclosure may additionally or alternatively be applied to "rides" such as rides at an amusement park. For example, the smart environment controller collects feedback from a user as the user passes through a smart room and provides reactive feedback to the user based on information determined or collected about the user or the group. The ride can be dynamically changed, such as making a left turn, or a right turn depending on the user responses or collected or determined information.

SET Attractions

All S.E.T. Attractions (Smart Rooms) and Smart Attractions that create a complete personalized, immersive, interactive physical experience come to life creating REAL mixed reality in live locations. Imagine Virtual Reality that is truly physical in 360 environments using the best themed entertainment techniques combined with machine learning computing, tracking that generates, instantly personalized and predictive content based on the users' interactions, history, anticipated enjoyment.

Story worlds come to life in the same way virtual reality immerses you in a 360-surrounded world DIGITALLY. SET does this physically. SET additionally allows for instantaneous changes S.E.T. (Smart Entertainment Technology) Smart Room applies to (out of the home) entertainment at theme park, waterparks, Museums, shopping centers, resorts, location based entertainment, events, etc. using R3 (Recognize, React, Record) in real time using emerging and existing intelligent, machine learning, AI software, hardware, firmware, visual, virtual, audio, thematic, special effects connected to a meshed personalizing system. All S.E.T combines the best and emerging tracking, responding and recording techniques and customizes experiences for guests and operators creating new, immersive, theatrical, advanced, interactive, personalized attractions.

The SET system is not just "smart" in how it responds physically (screens, effects, tracking, reading, data analytical responses) but it also uses technology/software/machine learning/AI, digital frameworks, knowledge about the user supplied by current or past input to react and "predict" customized advanced reactions in real time to the user.

Buildable SET Attractions (Within building/distributed throughout an entertainment/theme park/resort/shopping center, etc.)

Most importantly the rooms are built like kits. SET attractions on a "kit" like grid allowing for entire walls, that create floors, Smart rooms can be constructed wall-by-wall, ceiling and floor, furniture, etc. We can build and create a "wall" at a time. But a fully "decked" out wall with all the features that builds a smart room one slab/component at a time. Every wall, floor, cube, etc. is like a huge computerized IPAD (screen) with built the follow Smart Room features all built into it from tracking to camera's to displays to video/audio/physical and sensory effects. By putting each wall, floor, cube, ceiling, etc. together you can build grids of smart structures to create a room, hallway, maze, ceiling, magic door, floor, showcase area . . . Client can buy a smart ceiling only or a smart door only.

Figure 3:
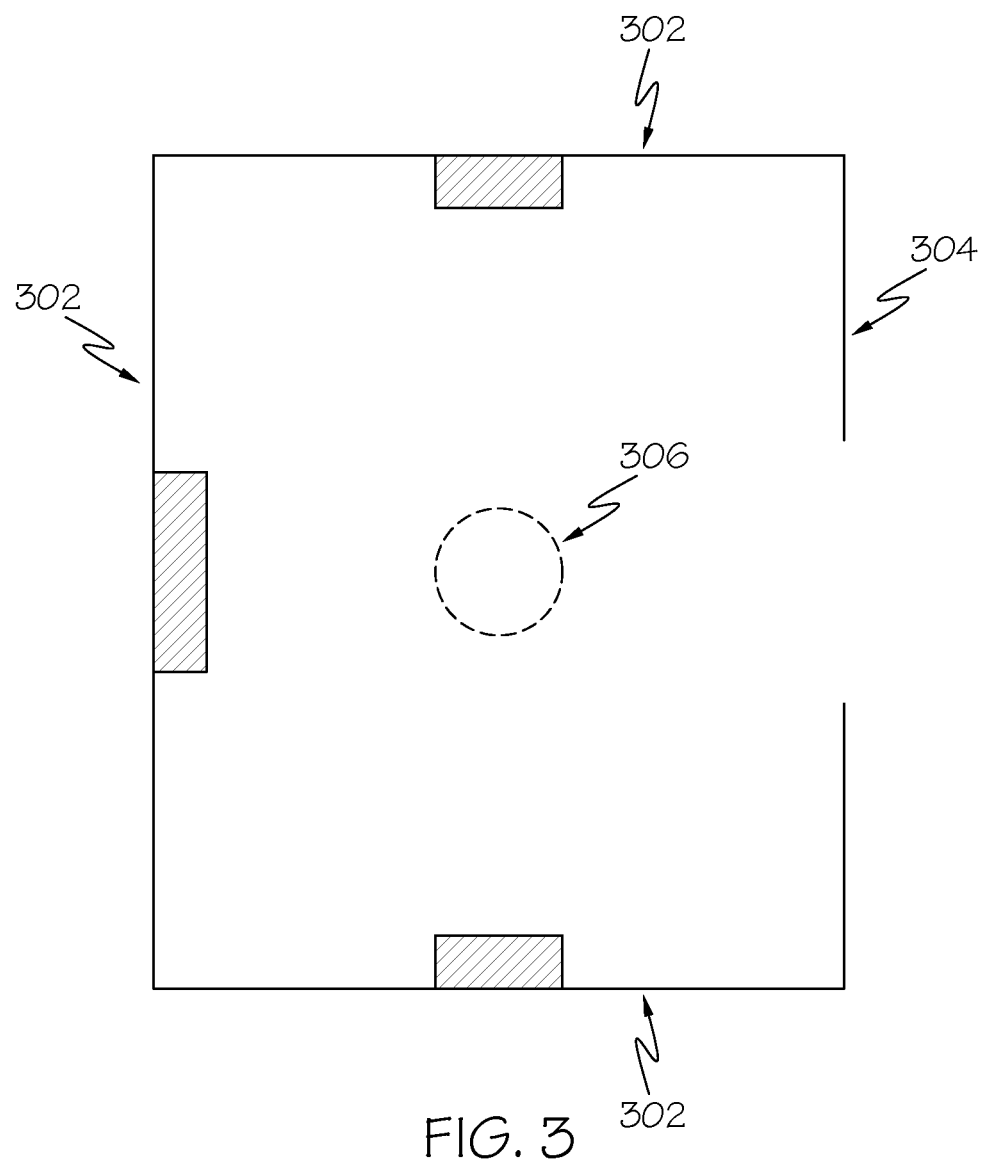
FIG. 3 illustrates an example square smart room with modular features and a cut-out for a spectator viewing area in accordance with a non-limiting embodiment of the present disclosure.
Figure 4:
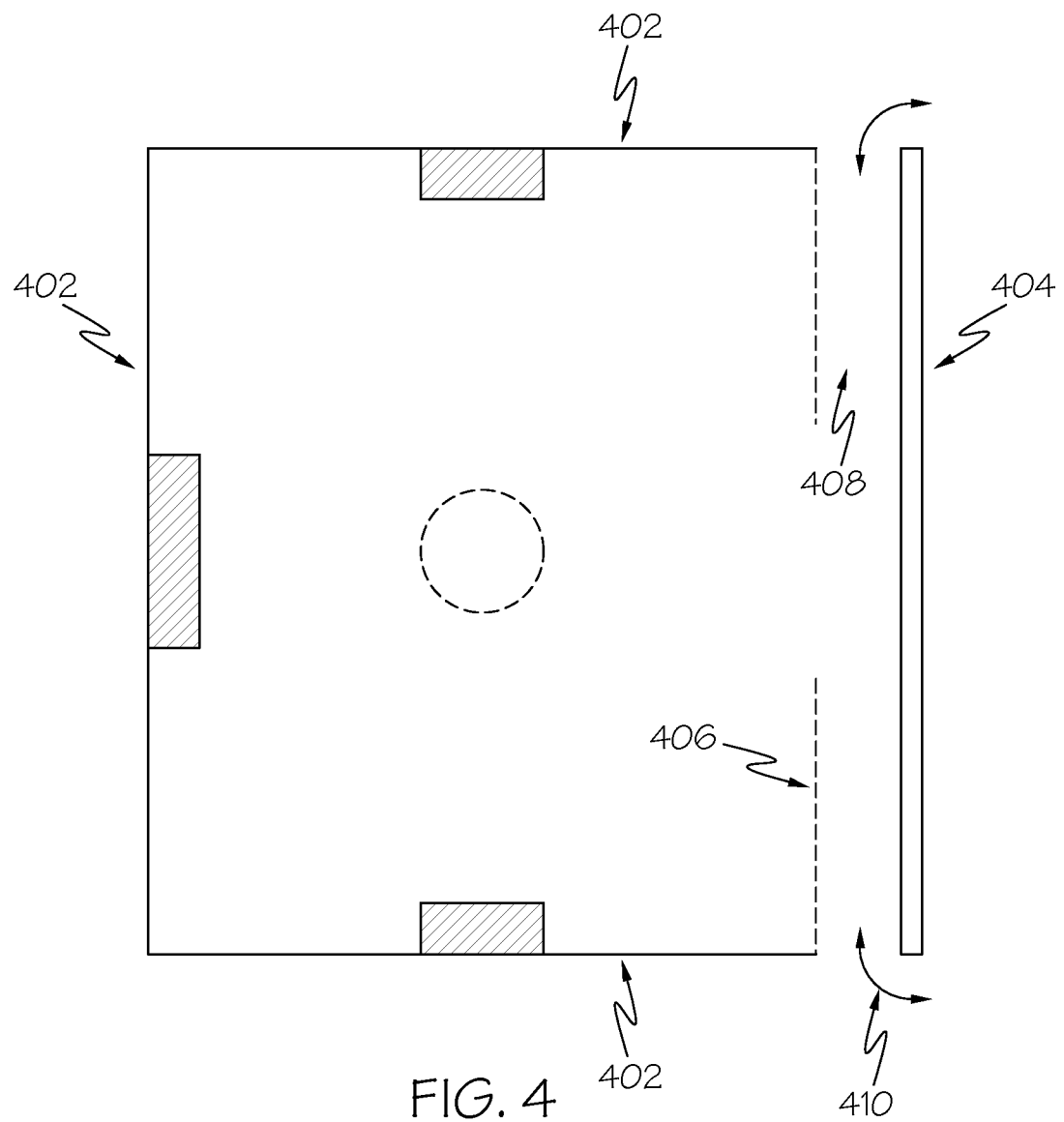
FIG. 4 illustrates an example square smart room with modular features and a cut-out for a spectator viewing area in accordance with a non-limiting embodiment of the present disclosure.
Figure 5A:
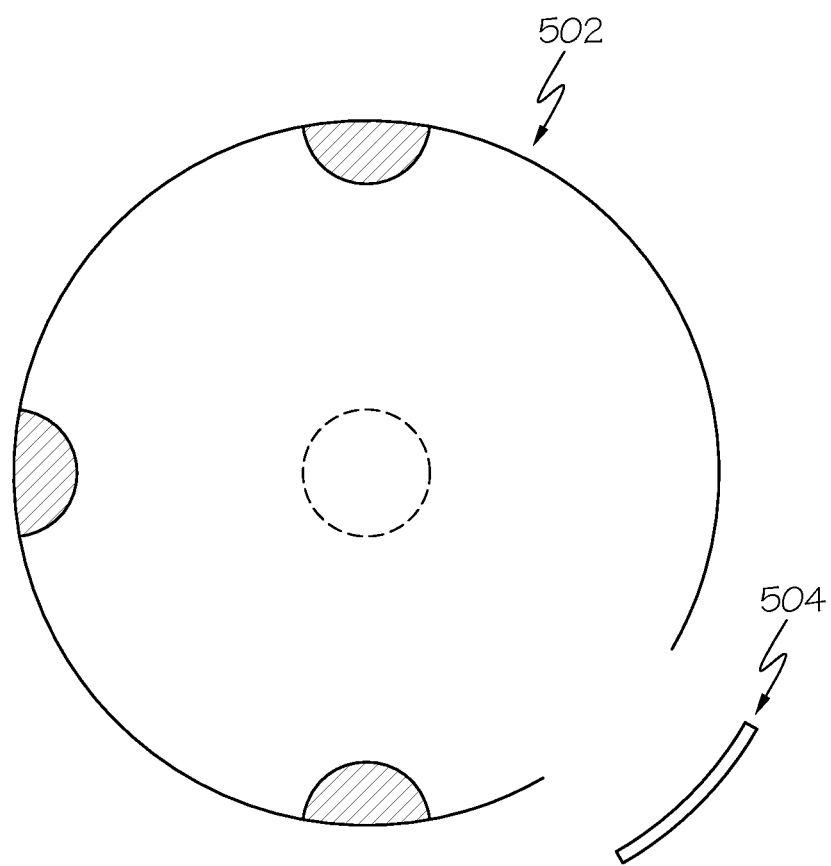
FIGS. 5A and 5B illustrate example round and octagonal smart room layouts with modular features and a cut-out for a spectator viewing area in accordance with a non-limiting embodiment of the present disclosure.
Figure 5B:
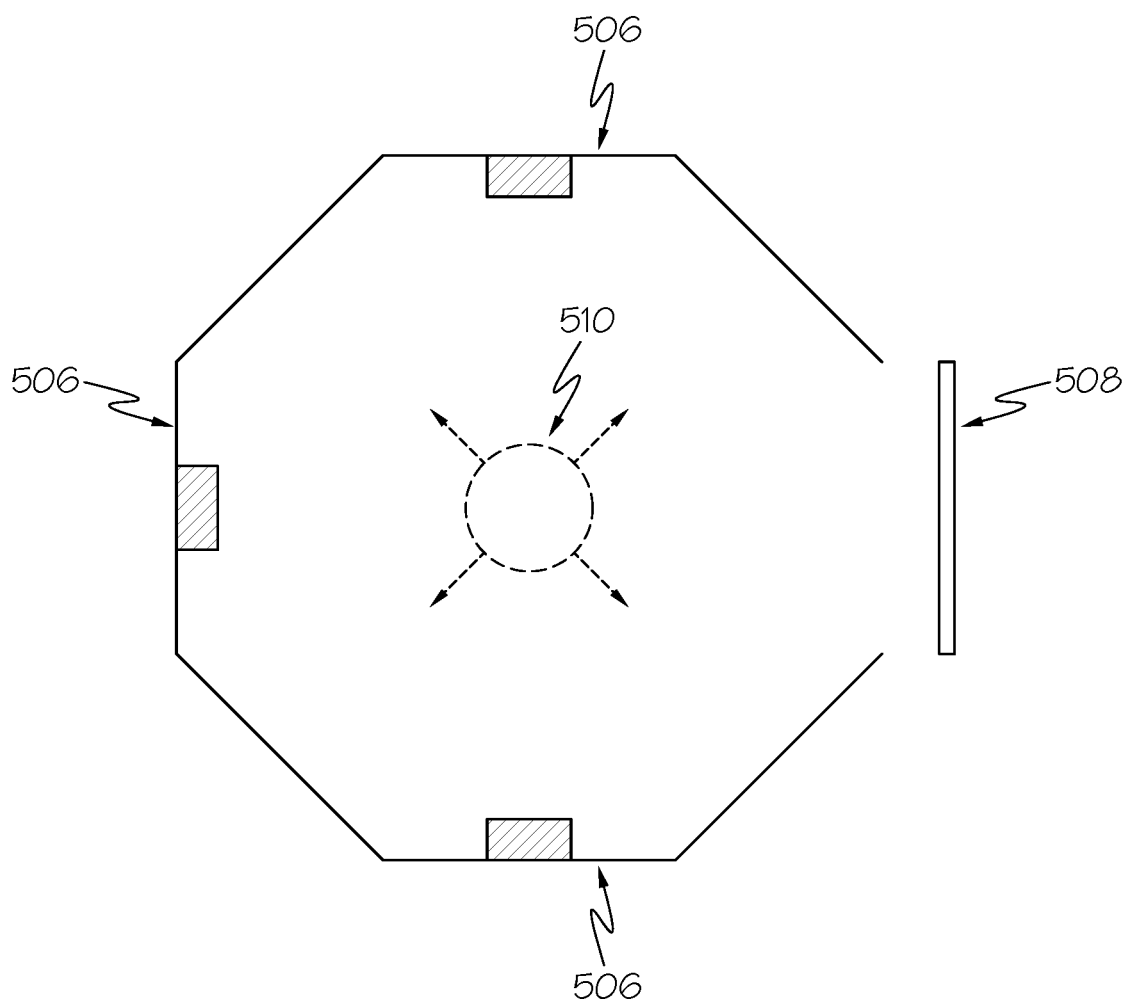

The wall system uses every available physical element including but not limited to digital screens, projections, sensors, haptic, themed effects, fog, lighting, water, wind, air, pressure, hologram, etc. that are inserted into the wall, floor, ceiling pedestals, themed items, unthemed items, monitors, doors, windows, etc. to create every changing ACTUAL (instead of just virtual or augmented) reality in real/instantaneous time. For example, FIG. 3 illustrates one particular configuration of video walls 302 and other interactive digital attractions to create a smart entertainment attraction. Video wall 304 is a "half wall" that provides for a viewing area, exposing real-life attractions. In addition, area 306 may include a hologram, 3D sculpture or animatronics. As another example, FIG. 4 illustrates another configuration of video walls surrounding 270 degrees of the attraction viewing area, with a separator wall dividing the surrounding digital attractions from a viewing area. In this configuration, video walls 402 surround the user in an immersive digital attraction experience, while half height walls 406 allow for user circulation and exit into and from the attraction. An additional full height video wall 404 is also provided. Other example configurations are presented in FIGS. 5A-B, where round or octagonal video walls (502 and 506, respectively) surround a center-pod event piece 510. A separator (504/508) allows for audience or user circulation into the attraction.

It is a place where the physical system combining some of the most relevant sensory, fluid screen and effect systems in live entertainment but it is SET in a grid of "buildable units" allowing for just about any cinematic, special and themed effects to come to life utilizing software and firmware technologies available.

In addition, the smart and intelligent system behind the "brains" of how it functions as a personalized recognizing, remembering and responsive experience is based on a perfected mix of media, technical and social networked system utilizing the most relevant and consumer-attractive options. The system not only allows for instantaneous, engagement in the live setting but connects to social, home based media/software and technology to engage non=live participants. This also allows for user generated, intelligently managed machine learning environments that grows with the experience and the user simultaneously.

The core purpose of the smart rooms is to create physical realities for intelligent applications using machine learning and Artificial intelligence enabling spaces to guide and make smart responses to the guests interacting in the space.
Digital Environment to Live Interaction The speed of response in the local/location based entertainment experience is real time instantaneously. Equally so are home based users effecting the live experience.

In virtual media entertainment, the intelligent responses are always digital. In this case the grid-build hardscape responds intelligently with physical reactions and customized responses. 5g networks and cloud-based technology will allow for extraordinary speeds making it completely "real" to the users even if it is user generated content triggering effects from home or other location users. The goal is to create live experiences that surpass digital ones given that the REAL entertainment is unlike anything a consumer can get at home. Given the customized effects related to the content and gaming being consumed or played—the life story games using AI and machine learning will be at the center of the system enabling hyper-real/personalized experience for individuals at scale In certain embodiments, there may be 3 high performance components to All S.E.T. One such component includes a recognition module, referred to as RECOGNIZE (Tracking and Knowing the User/Operator).

SmartRooms are designed so that various technologies that track and know who you are and respond to the guest or multiple guests based on image, voice, mobile device, mapping, GEO location, emerging, tech, what they have done, chosen, picked, created, bought, acquired, seen or accomplished before they entered. The room or characters and objects in the room can also change based on what guests do once inside the room.

Guests can wear a device into the room that will contain their information and/or the room will "know" the guest an what he/she has done thru both passive and active technology using various combinations of RFID, wireless, cell phone signals and devices, Bluetooth, proximity sensors, heat sensors, facial recognition, computer recognition, fingerprint scanning, x-ray, GPS, scanning and other new technologies yet to be developed for locating, tracking and identifying people and information on them as well as choices they have made.

Key "Smart Recognition features" of the room may include:
1) Device Tracking
2) Image Recognition
3) Voice Recognition
4) Mobile device Recognition
5) Facial/Fingerprint/Mapping Recognition
6) GeoLocation
7) Gesture and movement
8) Position on grids
9) Camera Tracking
10) Emerging Tech
11) Simple room based trigger (laser, light source)
12) Scanning (physical or object)
13) Hands-on Consumer powered input
14) Out of room interconnection to other
RFID
Augmented reality
Infrared
3D projection and mapping
Touchscreen/touch wall
Video walls
Video mapping
Phase array optics
Artificial intelligence
Surround sound
Robotics
Animation
Virtual reality
Mixed reality
Smart phone technologies Another such component may be a response component, referred to as: Response (Feedback based on unique data of user that gives customized, personalized audio, visual, physical, etc. effects reaction)

For example, once the room knows that the person has entered and instantly accessed the database of that's person history, preferences and past actions, it will queue certain audio/visual elements to occur in the room or series of rooms and hallways. SmartRooms will instantly know the preferences, accomplishments or missions for a group of people who enter at one time and tailor the experience to each individual and the group simultaneously.

A SmartRoom experience can be a single room, multiple rooms connected together or an endless number of "rooms" digitally connected around the world.

Level One SmartRooms can be a) blank white walls or b) partially built sets with one or more 3D props. When the SR is not in operation, all of the walls are white or blank screens. If the guests have chosen a haunted house mission, sensors leading into the room detect this and images appear all around the room to make it seem like it is a fully dimension room inside a haunted house. 3D glass, VR or AR may be worn by the guests to enhance this experience. However, this is not a "virtual" experience. It is a real experience that is only augmented by digital assets, not solely created around them. The key to this invention is how the real world changes (or seems to change) around and for the players.

If the guests have chosen an Egyptian pyramid adventure, images appear all around the room to make it seem like a fully dimensional room inside a pyramid.

If they guests have chosen an Amazon adventure, images appear all around the room or hallway to make it appear as a fully dimensional jungle all around.

3D mapping and projections may be used to project images onto otherwise blank 3D objects. For example a 4' wide by 6' high rectangle against one wall can appear to be a chest of drawers for the haunted house scene or it can appear to be a stone column as part of the pyramid interior.

Holographic images, smart animatronics and similar dimensional real or virtual items can also appear in the room based on information the guests have chosen or accomplished beforehand.

For example a witch can appear in the haunted house room or a mummy in the pyramid themed room. Those characters can be 2D video, holographic, animatronics or real people, each responding to the players seamlessly within the context of the story, past events and choices by the guest.

Furthermore, these "characters" can show different levels of scare factor based on what the guest has chosen beforehand. The witch and mummy can be horrifying, dripping blood and appear very aggressive on the highest settings, while being very tame or perhaps not in the room at all on the lowest settings. The room will know and play the scare factor based on information it gains from the players immediately before they enter.

The SmartRoom will also adjust the experience based on what guests may have previously accomplished, bought or been given. For example, perhaps the guest has a real or digital torch. Shadows will be shown on the video screens around the rooms and other areas of the room may remain dark as the guest moves around the room with the torch.

If the guest has earned a sword or dagger earlier in their experience, the mummy may attack them. Or perhaps they found an amulet in a previous room or experience. Hanging the amulet around the mummy's neck will make it come alive, speak to them and give them clues to the next room. The mummy may or may not appear if they have or haven't found the amulet. SmartRoom technology will adapt the experience to the guest or group constantly.

Multiple experiences such as these will happen to the guests in the room over a short or extended period of time.

Another feature of the SmartRoom is that as a theme park or Location Based Entertainment feature it knows that guests must be pulsed thru it at certain intervals to attain capacity requirements or throughput. The SmartRoom times the guest's entrance and automatically gives them easier and easier clues so they can find their way out within a predetermined period of time. Since this also happens seamlessly the guest doesn't know they are getting clues but perceive it as part of the experience.

For example, if the attraction requires that up to 20 guests need to pass thru the room every 3 minutes and the temple room requires them to press 10 different stone blocks on the wall with symbols on them the blocks glow faintly one at a time after they have been in the room for 1 minute, giving them clues for the correct blocks to touch. Some guests may be wearing devices which may also being to glow, pulse, and display or give a clue to the user in various ways what to do next. The longer they stay in the room the more obviously and brighter the blocks glow to motivate the players to touch them.

In addition, a holographic mummy can begin speaking clues to the guests after a certain period of time. Perhaps doors automatically open or close. All of these features work together seamlessly to move guests thru the experience in a way that doesn't seem to them artificial or disconnected from their story and experience.

In other versions of SmartRoom technology, live staff members that are part operational control and part actors are given cues by the SmartRoom when to appear, where and what to say to the guests to assist the guest or deepen their experience. The SmartRoom works together with the operations of the event space to seamless connect live action, animation, 3D and virtual experiences together so that the guest is never quite sure of what is real and what is a theme park attraction with the total goal of complete immersion of the guest into any storyline and theme within a given space.

In certain embodiments, Key Smart Reactive/Respond Technologies, Interactive and Theatrical Responses include:
Audio/Visual responses
SFX responses
Gamified and inventory
Customized A.! responses
Animatronic response
Retail item response
Mobile device response
Content Response
Room environment change response
Story and Game Data evolutionary response
Operational/Live staff response
Photo Response
Out of park reaction
Unlock/access response
Secure POS response
Media sharing response
Machine Activation (Print sticker, coin dispense)
Support (answer questions, give directions, map, clues) (ALEXA/GOOGLE HOME)
Leveling and gamification
Messaging
Mixed reality response (VR/AR)
Real time feedback, analytics and customization
Connection to "other" Smart rooms/experiences interaction
3D response
Smart Record/Remember Technology
Personal Info documentation
Store Customized Features
A.I. Preferences and analytics
Digital collection
Device upgrading
Mobile integration
App integration
Online integration
Operations analytics
Machine learning
Smart room upgrades In certain embodiments, a plurality of different devices can be used within the physical space, such as:
Magical items (wands, keys, compasses)
Torches
Tools
Glasses
Headphones
Suits
Magic globes
Shoes
clothing
Phones
iPads
Mobile devices
Watches Wristbands
Stuffed animals
Puppet packs
Clickable
Game controllers
Balls In certain embodiments, the physical space can include walk thru attractions, rides or combinations of those two.

SET Room Example: Dragon's Chambers

The following description applies to one non-limiting example embodiment of the smart entertainment technology described herein. The basic room consists of 3-4 extra-large format video or projection screen walls although the number of walls is unlimited. For this example, the SET room is preprogrammed with at least three different dragon encounters: 1) The Red Dragon battles the guest, 2) The White Dragon is tamed by the guest, or 3) The Green Dragon is challenging the guest to solve a puzzle in return for a spell or potion.

The room may also contain other features such as three dimensional theming (in this case stones, rock, and boulders), animatronics (dragon skull or statue), holographic images, special lighting effects, wind generators, floor touch sensors, etc.

Based on one of many options such as RFID, voice or facial recognition, phone or device activation/recognition, the room knows which scene to create just prior to the guest entering the room. Or the room may be on a default setting that will always show one scene so that blank walls are never visible to the guest.

The North, East and West walls are 12' high, high resolution video walls. The South wall is both the doorway into the space and a 4' wall so that spectators can observe what is going on inside the room. An optional 12' high wall is behind the spectator railing creating a full surround experience in while spectators can feel a part of but are not participating in the experience.

For the purpose of the example below, although any number of people can enter and interact in the SmartRoom, we will use an example of three players/guests for simplicity of illustration. One or more of those players can have a retail or rental device, use gesture movement, voice activation, a phone or a combination of those. For simplicity, the example will not refer to a device although the basic experience will be greatly enhanced by one.

The users may be on a story, mission, quest or adventure that will take them thru one or more Smart Entertainment Technology spaces including Rooms, Hallways and Chambers. Although the SmartSpace may be its own isolated experience, it is best when connected together in a series of modules. For this example we will assume that the users have experienced other SmartSpaces that lead up to this encounter in the sample SmartRoom.

The "default" video on all of the walls is of an ornate stone chamber with one large arched opening looking out over craggy mountain ranges in the distance. There are three 3D objects in the room around them that appear to be stone pillars topped with dragon skulls. The 3 dimensional quality of the video wall is such that users cannot discern where the real 3D objects stop and the video wall begins.

Because three players are "active", three sparkling shafts of light illuminates different spots on the floor. The light in the shafts sparkles compared to the dim room lighting around it. If each of the players walk into the shafts of light and stands in it, they activate a motion sensor. Or if they are unsure what to do and don't stand into the shafts of light, the SET queues a voiceover within the storyline they are participating in asking them to step into the shafts of light.

Once they step into the shafts of light the video walls all around them transition in a number of ways to make it appear that they have been transported to top of the craggy mountain they saw in the distance. Audio, visual and real effects such as fans for wind will accentuate the realism of their transportation and the arrival at a new space. The walls as well as the 3D real objects in the room transition together. The use of 3D glasses by the users may accentuate the experience.

As the users stand in the center of the mountain scene, a dragon appears far out in the distance in front of them, then flies to the left, across the top of the ceiling above and onto the right hand (east side) screen. It moves closer then hovers in the air, its image and wingspan filling up ¾ of the wall. The flapping of its wings pushes a breeze over the users with strategically placed but hidden fans.

The Dragon advances the storyline with a brief monologue that requires the users to complete three challenges to best him.

The first challenge comes to life with multiple angled laser beams projecting across the room in all directions horizontally and vertically. The users must move over, under and around the laser beams to reach specific spots in the room noted as glowing stones on the 3D objects within a certain time. The SET knows the skill level of each participant and makes the game easier for those on a younger setting with fewer beams to cross and harder for those with more experience by giving them more beams to cross.

The SET also tracks their progress thru the challenge and makes it easier for the user if they are having problems with achieving their goal within that time period. Unlike MagiQuest that had one skill level and ending for all players and unlike video games that have the same "boss" to beat with the same outcome, most often failure early, SET is designed and built so that most players win the challenge by varying it during its course so that it ultimately seems that they accomplished it themselves.

Once they have successfully achieved success, the game system moves to the next challenge, which can vary depending on the storyline of the user and the choices they have made to that point. The Challenges also change based on the number of users waiting in the queue to play the game next in order to accomplish the largest throughput and capacity possible.

An example of the next challenge would be for the dragon skulls on top of the stone pedestals to come alive either thru animatronics or 3D animation to advance the storyline of the users to the next challenge. For this game, alternate dragon skulls on one of three walls would glow faintly then flaming balls of fire would appear from the distance coming towards the users. They would have to duck, dodge and jump over each on as it appears to come into the user's space. In simple play mode one skull at a time would throw fireballs which is accentuated by the use of heat generators strategically placed in the room. In a more complex multiplayer version, several skulls would appear to throw flaming balls at the same time. The point of the game is to require users to move around the 3D dimensional space, while looking all around them which creates a unique and very realistic use of their body (physical selves) combined their thinking (cognitive skills) with video and SET effects that is adjusted automatically to their level, the storyline and number of players.

Often team play is required of multiple players to complete the challenges, all while moving around the SmartRoom and being tracked with SET.

As another example of a challenge, the dragon would circle the users, flying from once screen to another while talking to them and advancing the storyline from different screens. These requires the users to constantly move around and turn in the space looking in different directions. If they have a device, it would be required to be used in different directions as well. If they have multiple devices, they may need to be used in multiple directions. All combined it creates and immersive physical and visual space requiring thought and actions by the users in 3D space.

Various numbers of dragons would appear in this room based on the storyline, user settings and skill levels, all combined into one seamless experience that is lifelike and requires physical movement. This three dimensional immersive experience is much different than video games or MagiQuest which takes place on one video screen or on a ride where the vehicles move instead of the user. It is also much different than a virtual reality experience which is contained within googles and does not include any physical space or objects in the experience.

In other variations of SET, augmented glasses, phones, tablets and other devices are used together with the 3 dimensional objects and/or video screens for a more complex layering of effects and actions. SET will know if the user has such devices, including magic wands, wristbands, etc. and automatically adjust it for the user. It is also capable of adjusting the experience to accommodate users that don't have devices along with those that do. In addition, it can create multiple experiences for multiple devices at the same time.

For example one user might have a wand, while another has a touch and yet another a gauntlet, each being used in different ways to complete the storyline and/or mission.

Another example of a SmartRoom game is where users must touch different stones on the wall to illuminate them, guess a secret code or move them around. This is all accomplished thru a combination of video projection and gesture technology to appear realistic and three dimensional.

The SmartRoom is also capable of knowing if the user is on a completely different storyline then change the scene to accommodate that story, including usage of the real 3 dimensional props in the room. For example, instead of a Dragon challenge, the users might be on an Adventure that requires them to journey through a great library. In that case, the SET creates three dimensional video walls all around the user of shelves and giant stacks of books. The 3 dimensional props will now appear as stacks of books instead of stacks of stones. Users would be able to touch and "open" books or move them around to research their chosen adventure or complete a mission.

Considerations Using Emerging and Future Technolgies:

In certain embodiments, emerging technology includes one or more of the following:
  Artificial intelligence
  Digital Twin Technology (virtual mimics real)
  Real time animation
  Intelligent maintenance
  Conversational systems
  (Collaborative) Intelligent things
  The Virtual real assistant robotic or holographic assistant
  Sensory haptic feedback
  Fan-build technology
  Emotionally and persistently smarter expressive
  Machine learning, artificial intelligence and Real Time feedback/responses:

In certain embodiments, SET will have a "real" conversation with the player/user by using machine learning/A.I. and real time tracking to give responses that are/feel like a true evolving conversation and action/reaction to real time input from the user.

Conversational system between social media that is generated by users as well as the core media content and is flexing the response based on the conversations (coming in from the user based on preferences, game play, history, virtual and physical engagement). The "conversation" with the system allowing for the reactions of both the system (verbal, visual/content/specific tone, etc.) as the player engages more and more with the system.

and the player/user changes as the system (machine) learns preferences and active input simultaneously STORY Development in Real time Real story time upgrades and interactions with users and/or the space uses analytical collection of information, computer learning and intelligent software to create better stories based on real time data generated by users and pre-developed content. This platform can learn about the emotional and physical input of the user including their behavior patterns and generate typical scenarios that the personality type/player/historical data of that user would "like' to depict typical responses, plots, effects, triggers, transitions in the story world. The system builds upon generated responses predetermined in the system as well as machine learned, research enabled and AI agents to move the story in new personalized directions. The system will also take into consideration cultural and societal norms of the person or the location SET system.

Emotionally Intelligent Effects and Experiences

It also will have emotional intelligent and story-build techniques that engage the specific personality of the user. Example, if the system learns that the user disengages when in a phobic situation and the system does not want the produce the feeling of "fear" in the story—the system will provide more "open" and exploratory visuals and effects to tease more engagement out of the user. However, this same system, when wanting to produce fear—may visual and auditory make the rooms feel smaller specifically to tease this feeling *safely knowing from the same person.

Internal Entertainment Currency

The system may adopt a bit coin currency model as a way to trade virtual value and rewards. A gaming system often has reward/points. This variable could be used as a reward and loyalty system and use the devices to make "virtual" or real purchases.

A mesh system may be used to create a dynamic system that connects people, and things and support intelligent digital ecosystems. The mesh system evolves as the user experience changes using supporting technology. Using a fluid Omni-channel user experience.

The system shift from a stand-alone to a collaborative model in which intelligent things in the room communicate with one another and act in concert with the SET system and the players.

Personalization Engine

A personalization engine creates a unique profile for each visitor in real time as he browses and shops. Once the profile is created, learning software makes adjustments and additions as the customer inputs more information.

His shopping habits and browsing patterns provide details about his interests and needs. This information can be leveraged to create a site that is of greater interest to that particular customer each time he visits. This keeps him engaged within the site and interested in the merchandise.

Self Editing Platform

Self-editing platforms allowing for AI and machine learning updating the game and story based on information being collaboratively injected into our system. It could come from both the user and the creator's influence and the response system adjusts accordingly. Example would be a story world option (choosing from three character to have a conversation). Based on the game experience, the user's choices the characters will self-edit its response as and the surrounding SET effects adjusts as well. Further example. A character is chosen and has a specific skill such as throwing fireballs. The user has the magic ability to turn fireballs into firewalls. Once that character is chosen given the users specific magic skill combined with the characters capabilities the fireballs are turned into firewalls. Something the system did not have programmed until this combination was presented. The room then shows firewalls, heat, and other sensory effects as a result. The system has self-edited and created its own newly learned responses.

Social Media Interaction/Clicks

The system is connected to social media fan pages. Either in the game in the live experience or on the outside of the game (at home/other areas of the park/venue) you can "like" or comment on something happening in a specific space which increases its popularity or brings its entertainment features more upfront to incoming users. The more popular an event/story/experience/game feature is liked—the more "likely it is brought up first as an option to the new users.

Mobile Phone Remote Control in Live Experience

Once in the SET environment your mobile device automatically becomes a remote control. We sync our system to the mobile device recognized (using any and all mobile device technology options including Blue Tooth, the cloud, sensing devices, apps, etc.). Once the mobile device is connected the user can control a great deal of the room game, story, effects, story, music, lighting, personalizing features and information sharing. The user can digitally capture "ingredients", powers, skills, images, etc. for virtual storage and use. The user can send, direct scenes, customize games, either for future encounters or saving past experiences. The user can reach out to their Facebook, Instagram, photos—etc. and use them in the experience to enhance their game play, story worlds, personal features and experience overall. The mobile device becomes the orchestrator of the experience Augmented reality thru a device including glasses and/or phones (or a retail item that utilizes the AR technology but shaped as a magnify glass and/or magic mirror or glass ball you carry around in the experience creates a layer of content unseen in the physical world or story. Whether it is a mobile device producing the AR experience of the retail item it uses the SET room technology to trigger the additional content but also trigger things in the room that mimic and amplify the augmented layer. So the experience is very layered. Not just the augmented layer but effects, screens themed items and other rich interactive elements that tie into the whole story world.

The mobile device, much like a computer in your pocket will reach a range of devices, including other mobile connections and people using intuitive interfaces that dynamically control interfaces across physical and digital platforms in real and digital forms both 2d, 3d and beyond.

Projection Systems and Fluid Real Time Content

Normal and high-powered projector system can be used to turn any surface into a huge screen or layered digital content. SET can use its computing power to enable live streaming from a variety of sources allowing the projections to be instantaneous. They can be curated from material/media content already generated or even user generated material project real time images on surfaces including props, themed items, water curtains, fog, walls, ceilings floors and even people. The system can project from wall to wall and follow a user throughout the experience. It can pop up as a hologram making it feel like a robot or item in your hand is projecting an image.

Audio systems for directly, curating and surrounding the user in specific sounds for music, direction, sound effects, instant sound, echoing of voices, voice listening and the most advanced audio personalized system.

This can be used to create concerts, sports experiences, and voice direction. It can record and create instant voice recognition. It allows the user to customize sounds and music wherever they are in the experience. It is used to make the environment more real. An example of SET audio systems coming into the play is when a user waves a wand the sound system knows and makes a magical sound. But when the user lights a torch (embedded technology that triggers) it will make a "lighting" sound. If you throw a fireball. You will hear the sound travel from one point to the place you throw it. And if you throw a water ball it will customize instantly and make appropriate sounds. This of course is combined with sensory effects that also respond appropriately. The grid system is set up on the SET walls, ceilings and floors to create sound thru audio advanced systems allowing us to move the speakers, etc., to parts of the grid for best received effects.

Given that we have sophisticated speakers and sound systems we can use technology that triggers effects inaudible to people. So not only do we use our entire hardware and software system to track and follow or create an effect by the actions of the users or curators—we can also use these systems to trigger experiences through high frequency inaudible smart listening receptors. A user can then activate a specific sound causing an effect controlled by the speakers. This proves that all this engaging technology whether it is sounds and speaker systems or specific beacons, RFID readers, light sensors, any hardware, etc. to track, trigger, respond, collect data, personal the experience. As well as set off all and every triggered visual, auditory effect.

General Design and Development Considerations

The following describes features of creating live story worlds, and features of interactive attractions and structures including hands-on, digital, play grounds and rope course attractions.

Haunted Attraction—Experiential Key Components

The guiding philosophy: Achieve a play-thru adventure with the most propulsive and exciting techniques of haunted attractions, combined with the heart and inspiration of SeaWorld.

The keys:
Propulsion—the haunted attraction always "scares forward"; any effects or action should be timed and angled to propel guests forward; no action should interfere with forward path
Surprise—pulsed groups are ideal to preserve moments of surprise, but for uninterrupted lines of guests a triangular architectural grid design preserves views until the last possible moment around tight corners
Interaction—guests have few-second-long missions, either introduced by performers or scenic elements; an illuminated button tends to be pushed; an illuminated button with the message "do not push" shall certainly be pushed Levels—the haunted attraction surprises with effects not just on all sides of the guest path in "ping pong" fashion, but with effects underneath and above guests Misdirection—the haunted attraction excels at inspiring guests to focus on spectacle to mask a performer set-up or effect mechanism; lighting and scenic should have complete control over the guest POV Choice—guests shall have the illusion or effect of choice, either through the design of branching parallel paths or through implementation of true mazes, often with performer manipulation of route openings/closings Senses Play—the haunted attraction makes use of temperature shifts and pockets of scent, as well as evocative surface textures and surround sound; removing the majority of senses will focus on one sense for one room; flashes of temporarily blinding light can mask big effects Abrupt Tonal or Scale Shifts—the haunted attraction should not allow for visual fatigue, even in uniform environments such as forests, mansions, or caves; from space to space, the visual language should be abruptly different, including jumps from low ceilings to vaulted ceilings Animatronics and Puppetry—these tools allow for reliable performances from group to group; puppetry can be used to implement some actor control, including limited touch Previews—the haunted attraction shall be designed with visual previews of much later spaces early on; best case studies include large rooms with three or four paths in and out of them over the course of a single walkthrough Illusion—mirrors can be used to simulate much larger spaces than in reality, either horizontally or vertically; vortex tunnels, which can be adapted, shift guests' balance playfully with a rotating scenic tunnel Popcorn—guests of haunted attractions will not witness every effect; effects are designed for a leapfrog methodology, whereby performers quickly scare and then reset not for the next guest but for the next next guest; the cumulative effect is a perpetually active and surprising space Playful Guest Movement—haunted attraction designs frequently allow for guests to duck under obstructions, crawl, slide down slides, walk on slanted floors, or ascend stairs; for safety, no effects should occur during radically destabilizing moments Felt Presence—the haunted attraction makes ample use of the dark to fill in scenes; a few small scenic details, even if not visible to guests are palpably felt by guests and cause spaces to feel full Foundations of the Modern Funhouse Distortion Classic Example: Wacky Mirrors The modern funhouse should alter guests' points of view, through mirrors, optical illusions, augmented technology, and unusually-lit or manipulated physical surfaces Disorientation Classic Example: Spinning Tunnel The modern funhouse uses safe, dynamic physical components to spin and twist guests, or give them the illusion of an upside-down or diagonal transition; the resulting disorientation propels guests into unique engagement with the following space or scene, which can be fairly ordinary by comparison Abrupt Tactile Changes Classic Example: Faux Drawbridge In addition to walls with intriguing tactile surfaces, the modern funhouse compounds guests' surprise by supplementing surprise changes in terrain; leaves, mulch, stone, and even different types of wood are all distinguishable through guests' feet Exterior Previews Classic Example: Coney Island—all funhouses The modern funhouse façade is extensively perforated, allowing for context-less views into the various gags to be experienced; in addition, some experience paths can outwardly penetrate the façade; these moments can be capitalized upon, with the effect that guests inside appear to be undergoing situations of extreme danger Stacking Classic Example: Coney Island—all funhouses The modern funhouse is constructed with as much verticality as possible; in addition to perforated views through the façade, guests should be aware they need to ascend multiple levels throughout the experience; these stacked layers additionally create an auditory cacophony, as multiple guests navigate the structure Perspective Shifts Classic Example: The "Wonky" Room The layout of the modern funhouse includes spaces where both guests and scenic elements appear larger or smaller than in reality, utilizing tilted floors and spatial optical illusions to upend guests' sense of reality Simulated Peril Classic Example: Noah's Ark—Flooding Room The modern funhouse includes rooms of various scale which simulate natural or unnatural disasters impacting guests' path; these effects necessitate a quick reset; guests may perceive floods of water, crumbling structures, fire spreading, floors with large gaps to walk over Sight Gags Classic Example: The "Shoe Fly"

The modern funhouse should include numerous instances of visual plays on words or concepts; these elements act as "Easter eggs" throughout the experience, and often serve to populate spaces rather than act as interactive elements; these cause a pervading sense of play The Impossible Classic Example: Poseidon's Fury—Water Tunnel The modern funhouse includes at least one visual effect which appears to defy the laws of physics Purposeless Play A dichotomy is set between moments of play with specific cause and effect intent and play with deliberate purposelessness; the modern funhouse is a place of discovery, fun, and surprise; in the upside-down world of the modern funhouse, more effort often takes you farther from your goals Sensory Deprivation Classic Example: The Blackout Room Akin to the classic "Tunnel of Love," the modern funhouse intentionally removes visual guideposts at times, forcing guests to explore by means of other senses The Transferrable Tactics of Escape Rooms Group Collaboration The escape room thrives in setting milestones along the experiential path to be conquered by many individuals separately, as well as milestones which can only be conquered by many guests at once; the ideal escape room keeps all guests involved at all times by alternating these two approaches; an example of a group collaborative puzzle is one in which guests must hold hands to conduct electrical current from one target to another Observation The escape room guest is trained quickly by the experience to assume that every detail in the space is deliberate; from an experiential perspective, this forces guests to pay complete attention to the story and experience, noting small details which might otherwise be missed Different Forms of Logic/Thinking Escape room design assumes that participants will represent different forms of logic and thinking; the ideal escape room offers effects and puzzles for the linguistic thinker, mathematical thinker, visual thinker, etc.

Assumed Roles

The escape room centrally focuses upon some sense of urgency; in order to build urgency, a story is introduced with assumed roles for guests, compelling them to complete puzzles "in character"; rooms are frequently outfitted with costume pieces to allow guests to more deeply immersive themselves in their roles "Ticking Clock"

Urgency is key to the escape room design; typically, some form of literal "ticking clock" is included to make guests hyper-aware of diminishing time; the experience duration is also punctuated with smaller ticking clock moments, with the effect of momentary relief upon completion of a puzzle, followed by immediate return to intensity Expanding Spaces The escape room layout is frequently comprised of multiple connected rooms, but guests are initially only able to perceive one or receive hints of a second which is at first inaccessible; the dual effect of this approach is an incentive to play in order to see more, as well as visual spectacle and surprise upon revealing the next room, often involving dramatic reveals, slides, or tunnels Multi-Utilization The escape room perpetuates a philosophy of multi-utilization, inspiring guests towards more creativity in the "real world" after their experience; quite often, one object discovered within the experience will have multiple purposes; significantly, most locks in a room are one-use only, giving guests a sense of achievement and forward motion Upending the Familiar Alternately, the escape room often uses traditional objects for highly untraditional puzzle effects; guests must rethink how they perceive everyday props in order to progress within the experience Cause and Effect The escape room links puzzles together, even across the physical space; as one puzzle is solved, it stimulates an effect elsewhere in the room, creating a trail of anticipation; this design approach enforces the correct progression through puzzles Elemental Manipulation Escape room puzzles sometimes include tactile joys beyond simple writing surfaces, digital interfaces, and locks; key puzzles can include the manipulation of water or electricity in order to "solve" a conundrum Red Herrings and Overstimulation Playing on the earlier notion of observation, escape room designers pointedly include too much information in each scene of the experience; elements which seem highly significant have no purpose at all, save for throwing guests off the trail Chapters Escape room complexes sometimes introduce rooms which serve as progressive chapters to each other; while each room should be able to function independently for a one-time participant, guests who play across chapters will benefit from accumulating insight Live Host The live performer/host/puzzle master is key to the escape room; typically, one live employee is present for each escape room, although there may be multiple employees with different functions; these hosts monitor the guests from inside or outside the room; the hosts may function as a character in then story, or may operate outside the story; their chief responsibility is to dole out hints to guests; hints generally remove minutes from the guests' "ticking clock," thereby dissuading guests from repeatedly requesting hints Key Features in Digital and Mixed Media Technology Attraction (and/or upgrades)

Top entertainment experiences in Theme Parks

Top entertainment experiences in Location Based Entertainment

Top operational features of guest management

Core Business objectives of theme park and location based entertainment

Systems and Methods

Figure 9:
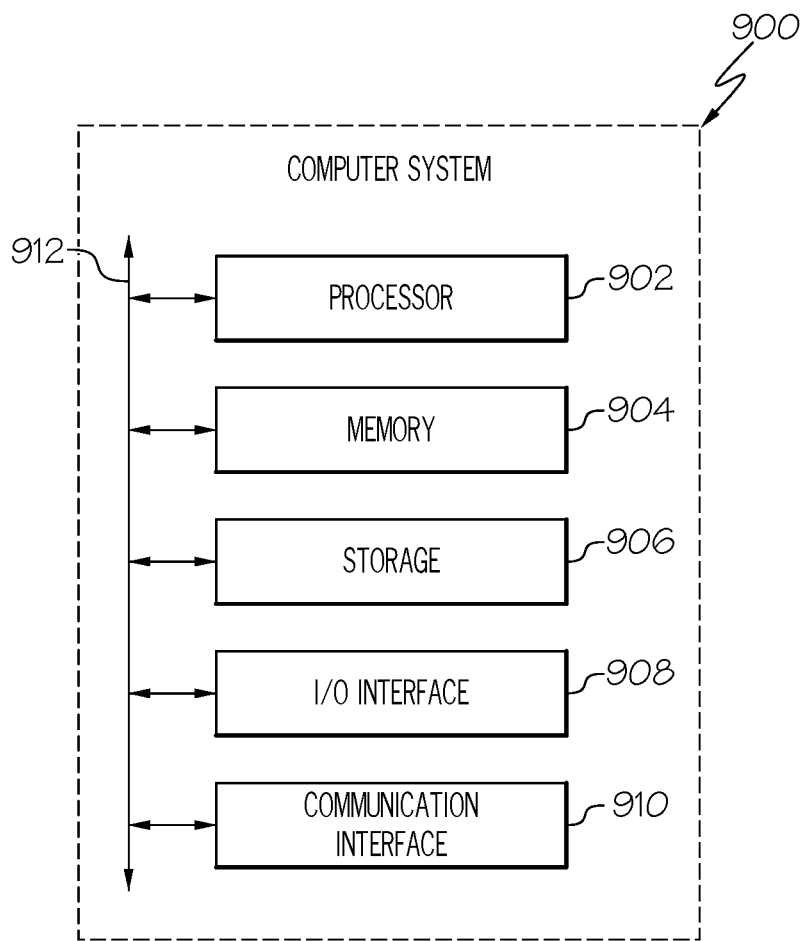
FIG. 9 illustrates an example computer system.

FIG. 9 illustrates an example computer system 900. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900. Herein, reference to a computer system may encompass a computing device, and vice versa, where appropriate. Moreover, reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
   by one or more computing devices, identifying a plurality of patrons in an entertainment attraction using a contactless sensor, wherein the entertainment attraction comprises a room, and wherein each wall of the room comprises a full-wall digital display;
   by the one or more computing devices, determining an age and attraction preferences of each of the patrons;
   by the one or more computing devices, determining a digital attraction experience suitable for each of the patrons based on the age and attraction preferences of each of the patrons, and a number of patrons waiting in a queue to enter the room;
   by the one or more computing devices, formatting for display on the full-wall digital displays content associated with the determined digital attraction experience;
   by the one or more computing devices, determining an interactive gesture performed by a particular one of the patrons; and
   by the one or more computing devices, formatting for display on the full-wall digital displays, content responsive to the interactive gesture based on the age and attraction preferences of the particular one of the patrons.

2. The method of claim 1, wherein the sensor includes a scanner.

3. The method of claim 1, wherein the sensor includes a camera.

4. The method of claim 1, wherein the sensor includes a facial recognition sensor.

5. The method of claim 1, wherein the sensor includes a biometric recognition device.

6. The method of claim 1, wherein the system records activity of each of the plurality of patrons, and wherein the content displayed by the digital displays is customized based on the activity.

7. The method of claim 1, wherein the content comprises video.

8. The method of claim 1, wherein the content comprises physical motion of an animatronic robot.

9. The method of claim 1, wherein the content comprises audio.

10. The method of claim 1, wherein the full-wall digital displays are modular and configurable.

11. One or more computer-readable non-transitory storage media embodying software that is operable when executed to:
- identify a plurality of patrons in an entertainment attraction using a contactless sensor, wherein the entertainment attraction comprises a room, and wherein each wall of the room comprises a full-wall digital display;
- determine an age and attraction preferences of each of the patrons;
- determine a digital attraction experience suitable for each of the patrons based on the age and attraction preferences of each of the patrons, and a number of patrons waiting in a queue to enter the room;
- format for display on the full-wall digital displays content associated with the determined digital attraction experience;
- determine an interactive gesture performed by a particular one of the patrons; and
- format for display on the full-wall digital displays, content responsive to the interactive gesture based on the age and attraction preferences of the particular one of the patrons.

12. The computer-readable non-transitory storage media of claim 11, wherein the sensor includes a scanner.

13. The computer-readable non-transitory storage media of claim 11, wherein the sensor includes a camera.

14. The computer-readable non-transitory storage media of claim 11, wherein the sensor includes a facial recognition sensor.

15. The computer-readable non-transitory storage media of claim 11, wherein the sensor includes a biometric recognition device.

16. The computer-readable non-transitory storage media of claim 11, wherein the system records activity of each of the plurality of patrons, and wherein the content displayed by the digital displays is customized based on the activity.

17. The computer-readable non-transitory storage media of claim 11, wherein the content comprises video.

18. The computer-readable non-transitory storage media of claim 11, wherein the content comprises physical motion of an animatronic robot.

19. The computer-readable non-transitory storage media of claim 11, wherein the content comprises audio.

20. A system comprising:
- one or more processors; and
- a memory coupled to the processors comprising instructions executable by the processors, the processors being operable when executing the instructions to:
  - identify a plurality of patrons in an entertainment attraction using a contactless sensor, wherein the entertainment attraction comprises a room, and wherein each wall of the room comprises a full-wall digital display;
  - determine an age and attraction preferences of each of the patrons;
  - determine a digital attraction experience suitable for each of the patrons based on the age and attraction preferences of each of the patrons, and a number of patrons waiting in a queue to enter the room;
  - format for display on the full-wall digital displays content associated with the determined digital attraction experience;
  - determine an interactive gesture performed by a particular one of the patrons; and
  - format for display on the full-wall digital displays, content responsive to the interactive gesture based on the age and attraction preferences of the particular one of the patrons.

* * * * *